US010433560B2

(12) United States Patent
Berger et al.

(10) Patent No.: US 10,433,560 B2
(45) Date of Patent: Oct. 8, 2019

(54) FOOD FOLDING PLATFORM AND COMPONENTS THEREFOR

(71) Applicant: Solbern, Inc., Fairfield, NJ (US)

(72) Inventors: Thomas G. Berger, Ridgefield, NJ (US); Moysey Shtilerman, Elmwood Park, NJ (US)

(73) Assignee: Solbern Inc., Fairfield, NJ (US)

( * ) Notice: Subject to any disclaimer, the term of this patent is extended or adjusted under 35 U.S.C. 154(b) by 1167 days.

(21) Appl. No.: 14/536,131

(22) Filed: Nov. 7, 2014

(65) Prior Publication Data

US 2015/0128817 A1 May 14, 2015

Related U.S. Application Data

(60) Provisional application No. 61/901,852, filed on Nov. 8, 2013.

(51) Int. Cl.
  *A21C 15/00* (2006.01)
  *A21C 9/08* (2006.01)
  *A23P 20/20* (2016.01)
(52) U.S. Cl.
  CPC ............ *A21C 15/007* (2013.01); *A21C 9/088* (2013.01); *A23P 20/20* (2016.08)
(58) Field of Classification Search
  CPC ...... A21B 3/155; A47J 37/067; A47J 37/0704
  USPC ..... 99/450.6, 450.7; 425/112, 113, 117, 323; 426/138, 297, 502
  See application file for complete search history.

(56) References Cited

U.S. PATENT DOCUMENTS

| 1,891,845 | A | 12/1932 | Sptiz et al. |
| 2,107,749 | A | 2/1938 | Curtis |
| 2,574,548 | A | 11/1951 | Deutsch |
| 2,855,867 | A | 10/1958 | Zeillin |
| 3,356,044 | A | 12/1967 | Keathley et al. |
| 3,669,007 | A | 6/1972 | Pullci |

(Continued)

FOREIGN PATENT DOCUMENTS

GB 1913/16559 A 7/1914

OTHER PUBLICATIONS

International Search Report dated Feb. 18, 2015, issued in connection with International Application No. PCT/US14/55310 (4 pages).

(Continued)

*Primary Examiner* — Tu B Hoang
*Assistant Examiner* — Thomas J Ward
(74) *Attorney, Agent, or Firm* — McCarter & English, LLP

(57) ABSTRACT

A folding platform includes a base, first folding flap, lift arm, and lift arm linkage. The first folding flap is rotatably connected with the base and facilitates the folding of a food item placed on the folding platform. The lift arm linkage is rotatably connected with the base and the lift arm to operatively lift the lift arm and allow the lift arm to rotate in a first rotational direction, and includes a spring that engages the lift arm linkage and the lift arm, and biases the lift arm in a second rotational direction opposite the first rotational direction. The lift arm is capable of rotating a first rotational distance, and rotating a second rotational distance greater than the first rotational distance without bending or breaking when the lift arm contacts an obstruction. The lift arm automatically returns to its normal position due to the bias force of the spring.

18 Claims, 20 Drawing Sheets

(56) References Cited

U.S. PATENT DOCUMENTS

| | | | |
|---|---|---|---|
| 3,745,911 A * | 7/1973 | Kennedy, Jr. | A47J 43/18 |
| | | | 99/426 |
| 3,912,433 A | 10/1975 | Ma | |
| 3,920,440 A | 11/1975 | Takaoka et al. | |
| 4,084,493 A | 4/1978 | Quintana | |
| 4,193,373 A | 3/1980 | Hanson, Jr. et al. | |
| 4,388,059 A | 6/1983 | Ma | |
| 4,393,758 A | 7/1983 | Anmahian | |
| 4,457,225 A | 7/1984 | Bakker | |
| 4,483,242 A | 11/1984 | Goodman et al. | |
| 4,516,487 A | 5/1985 | Madison et al. | |
| 4,608,919 A | 9/1986 | Prows et al. | |
| 4,638,729 A | 1/1987 | Woodworth et al. | |
| 4,691,627 A | 9/1987 | Roberts | |
| 4,913,043 A | 4/1990 | Cheung | |
| 4,938,981 A | 7/1990 | Hee | |
| 4,961,948 A | 10/1990 | Hee | |
| 5,085,138 A | 2/1992 | Fehr et al. | |
| 5,263,407 A | 11/1993 | Pomara, Jr. | |
| 5,405,256 A | 4/1995 | Dalton | |
| 5,912,035 A * | 6/1999 | Grat | A21C 9/063 |
| | | | 426/138 |
| 7,487,718 B2 * | 2/2009 | Foulon, Jr. | A21C 9/063 |
| | | | 426/502 |
| 2006/0107846 A1 | 5/2006 | Foulon, Jr. et al. | |
| 2006/0144254 A1 | 7/2006 | Foulon, Jr. et al. | |

OTHER PUBLICATIONS

Written Opinion of the International Searching Authority dated Feb. 18, 2015, issued in connection with International Application No. PCT/US14/55310 (5 pages).
International Search Report dated Feb. 11, 2015, issued in connection with International Application No. PCT/US2014/064633 (2 pages).
Written Opinion of the International Searching Authority dated Feb. 11, 2015, issued in connection with International Application No. PCT/2014/064633 (7 pages).
U.S. Appl. No. 14/029,512, filed Sep. 17, 2013, Multi-Stage Rotary Food Product Folder (92 pages).
PCT International Patent Application No. PCT/US2014/064633 filed Nov. 7, 2014, Food Folding Platform and Components Therefor (65 pages).
PCT International Patent Application No. PCT/US14/55310 filed Sep. 12, 2014, Mult-Stage Rotary Food Product Folder (94 pages).

* cited by examiner

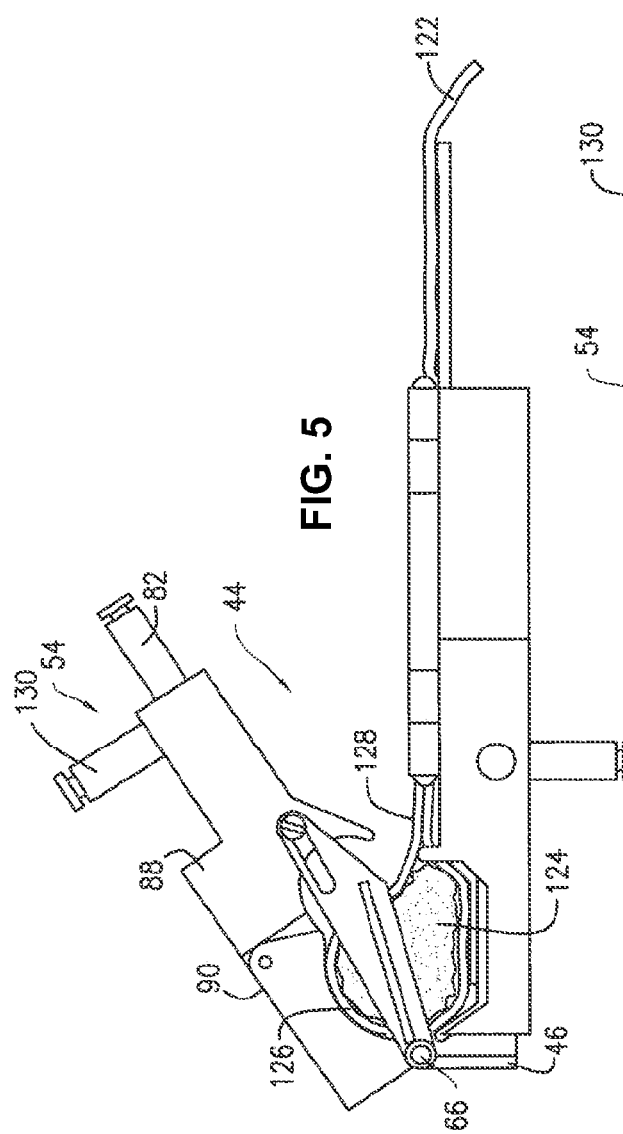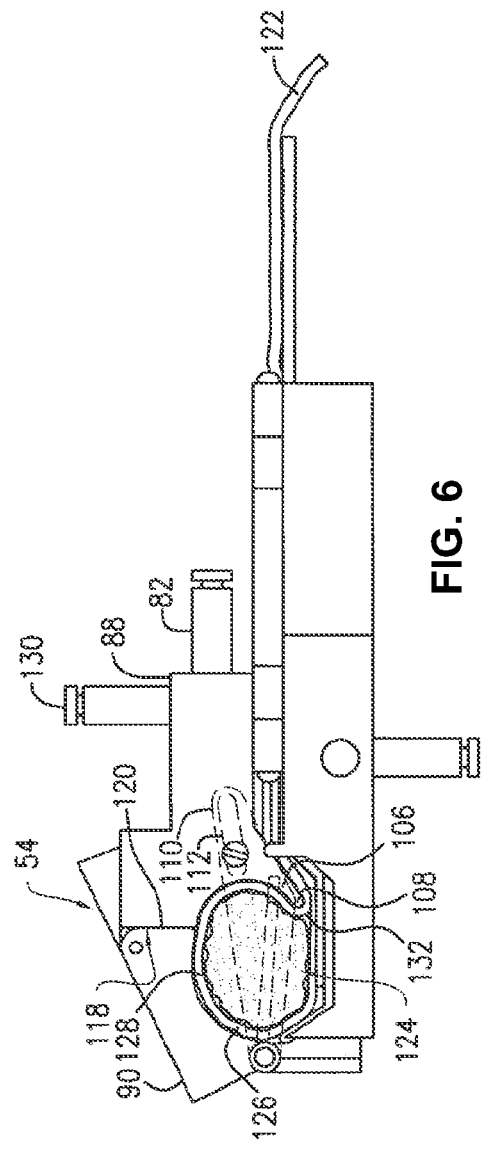

FOOD FOLDING PLATFORM AND COMPONENTS THEREFOR

RELATED APPLICATIONS

The present application claims the benefit of priority to U.S. Provisional Patent Application No. 61/901,852, filed on Nov. 8, 2013, which is incorporated herein by reference in its entirety.

FIELD OF THE INVENTION

The present invention relates to an improved platform used in the automated formation of folded food products, such as burritos, taquitos, stuffed grape leaves, eggrolls, and the like.

BACKGROUND OF THE INVENTION

Apparatus for forming folded food products are described in U.S. Pat. Nos. 5,912,035 and 7,487,718, the disclosures of which are incorporated herein by reference in their entirety. In embodiments of such apparatus, a machine carries a plurality of folding platforms for forming the folded food products. The folding platform includes a base, at least one flap pivotally mounted to the base, and a lift arm pivotally mounted to the base. In some instances a second and third flap may also be pivotally mounted to the base. The folding platform further includes a channel-shaped depression. In some embodiments, the flap generally includes a ridge for folding a tortilla or other food product. The ridge is generally sized and shaped for a particular food product size and diameter. For example, the ridge on the flap of a first platform may have a twenty-five millimeter diameter curve for creating a small taquito, and a ridge on the flap of a second platform may have a thirty-five millimeter diameter curve for creating a larger taquito. When a user wishes to manufacture food products of different sizes or geometries they must remove the platforms having the first sized ridge from the machine and replace them with platforms having a second sized ridge.

During production of the food product, a tortilla is placed or draped on the folding platform in a more or less centered position, after which a portion of a food filling is deposited on the tortilla above the approximate location of the depression in the base. The first flap of the folding platform is then initially actuated by being rotated/overturned about a respective hinge in a pivoting motion with respect to the base, after which the first flap is returned to its starting position. This causes a first side of the tortilla to be folded more or less entirely over the food filling portion, thereby creating a first fold in the tortilla. For some food products, such as a burrito for example, additional folding flaps are useful. However, where the folding platform includes a second and third flaps, each of the second and third flaps are actuated next by being rotated/overturned about their respective hinges in separate sequential pivoting motion with respect to the base, after which the second and third flaps are returned to their starting positions. These actuations cause opposite second and third sides of the tortilla to be folded both toward each other and on top of the previously folded first side of the tortilla, thereby creating respective second and third folds in the tortilla. In some embodiments, the food product is then lifted by the lift arm and transferred to a removal assembly for further folding. For example, in some embodiments, the removal assembly could be the removal assembly 3222 of FIG. 19, which includes first and second tracks 3224a, 3224b and a central arm 3226 that interface with the lift arm during removal of the food product. During transfer, the lift arm may contact components of the removal assembly 3222 where they have become misaligned, or food product that has not been removed. In such scenarios, the lift arm may be undesirably manipulated or even break off.

What is needed in the art is a folding platform that includes an improved lift arm. What is also needed in the art is a folding platform that can easily be altered to accommodate food products of different sizes/dimensions and/or geometries, e.g., a first food product of one size and a second food product of a second size different than the first size.

SUMMARY OF THE INVENTION

The present disclosure relates generally to folding platforms for preparing folded food products. More specifically, the present disclosure relates to a folding platform that includes an improved lift arm. Additionally the present disclosure relates to a folding platform that includes a removable ridge insert.

In one aspect of the present invention, a folding platform includes a base, and a folding flap (e.g., a first folding flap), a lift arm, and a lift arm linkage. In some embodiments, the base may also include a second folding flap, and a third folding flap. The first, second, and third flaps are rotatably connected with the base and facilitate the folding of a food item that is placed on the folding platform. The lift arm linkage is rotatably connected with the base and the lift arm to operatively lift the lift arm and allow the lift arm to rotate in a first rotational direction. The lift arm linkage includes a spring that engages the lift arm linkage and the lift arm, and biases the lift arm in a second rotational direction that is opposite the first rotational direction. The lift arm is capable of rotating a first rotational distance for removing a food product, and rotating a second rotational distance greater than the first rotational distance without bending or breaking when the lift arm contacts an obstruction. Upon removal of the obstruction, the lift arm automatically returns to it's normal position due to the bias force of the spring.

In another aspect of the present invention, a folding platform includes a base, a folding flap, and a removable ridge insert. The folding flap includes a channel, and a securing means. The removable ridge insert has a ridge formed along an edge thereof and a retention means. The folding flap is pivotally connected with the base and facilitates with the folding of a food item that is placed on the folding platform. The removable ridge insert is configured to be inserted into the channel and removably retained in the channel through an engagement of the securing means with the retention means. The ridge is adapted to form an elongate fold in the overlaying side portion of the flexible shell, and to tuck the elongate fold underneath the food filling portion opposite the first elongate edge of the folding flap. Accordingly, a first removable ridge insert can be provided with a first arched ridge having a first diameter corresponding with a first diameter of a first food product, and a second removable ridge insert can be provided with a second arched ridge having a second diameter corresponding with a second diameter of a second food product, where the first diameter is different than the second diameter, for example.

Additional features, functions, and benefits of the disclosed platform will be apparent from the detailed description which follows, particularly when read in conjunction with the accompanying figures.

BRIEF DESCRIPTION OF THE DRAWINGS

The above and other objects, features and advantages of the present invention will be apparent from the following detailed description of the following exemplary embodiments of the invention considered in conjunction with the accompanying drawings, in which:

FIG. 5 is a side elevational view of the folding platform of FIGS. 1 and 3 with the articulated first flap in its first folding position (as shown in the FIG. 4 top plan view);

FIG. 6 is a side elevational view of the folding platform of FIGS. 1 and 3 with the articulated first flap in its second folding position;

DETAILED DESCRIPTION OF THE INVENTION

Referring to U.S. Pat. Nos. 7,487,718 and 5,912,035, FIGS. 1-13 illustrate two embodiments of folding platforms that do not include the spring-biased lift arm or the removable ridge insert of the present invention. However, these embodiments of FIGS. 1-13 are described herein to provide exemplary context for the improvements of the spring-biased lift arm and the removable ridge insert of the present invention. Both the spring-biased lift arm and the removable ridge insert of the present invention will be shown and discussed in greater detail below with reference to FIGS. 14-33. It should be understood that the improvements of the spring-biased lift arm and the removable ridge insert of the present invention are not limited to any single embodiment of a folding platform and could be implemented with any suitable food folding platform.

Figure 1:
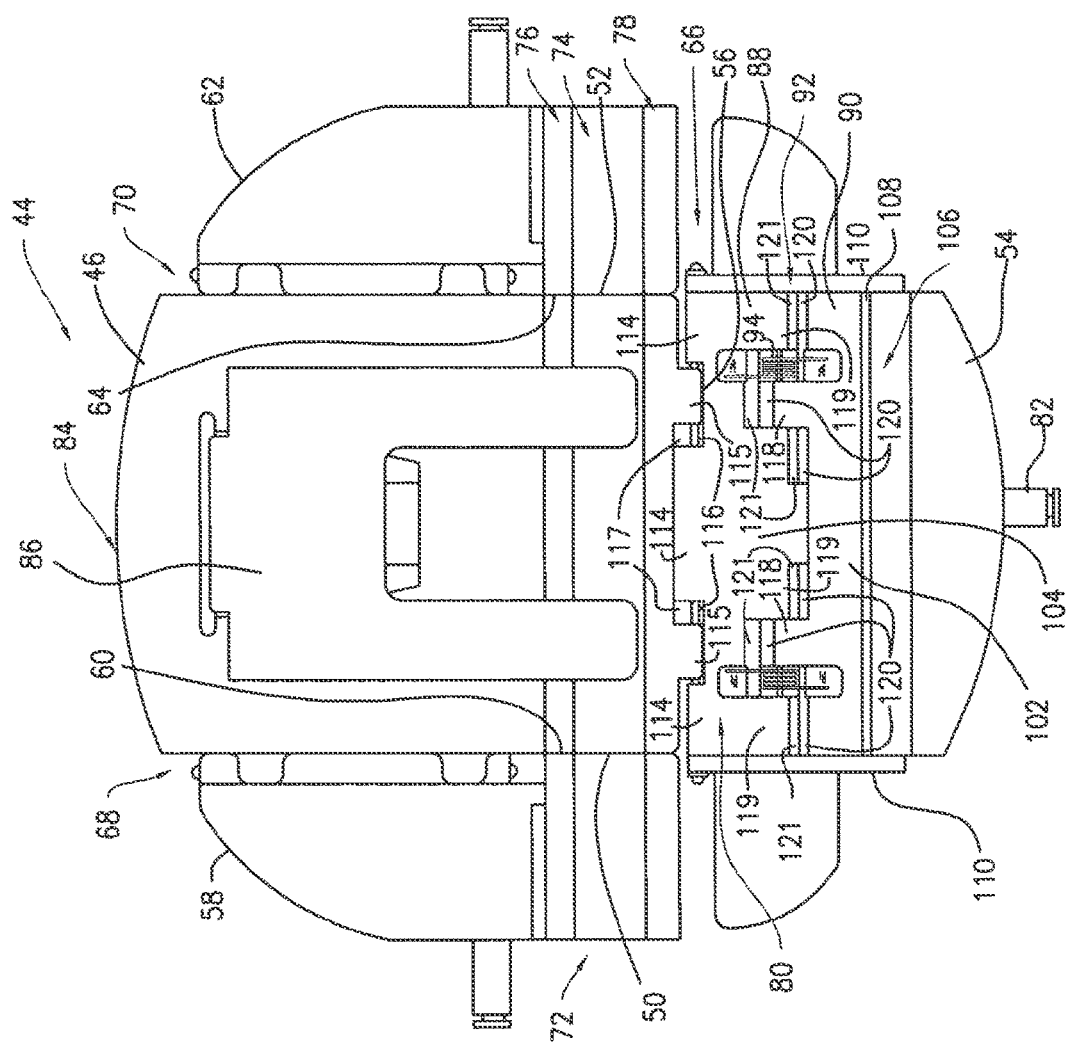
FIG. 1 is a top plan view of a folding platform constructed in accordance with a first embodiment.
Figure 2:
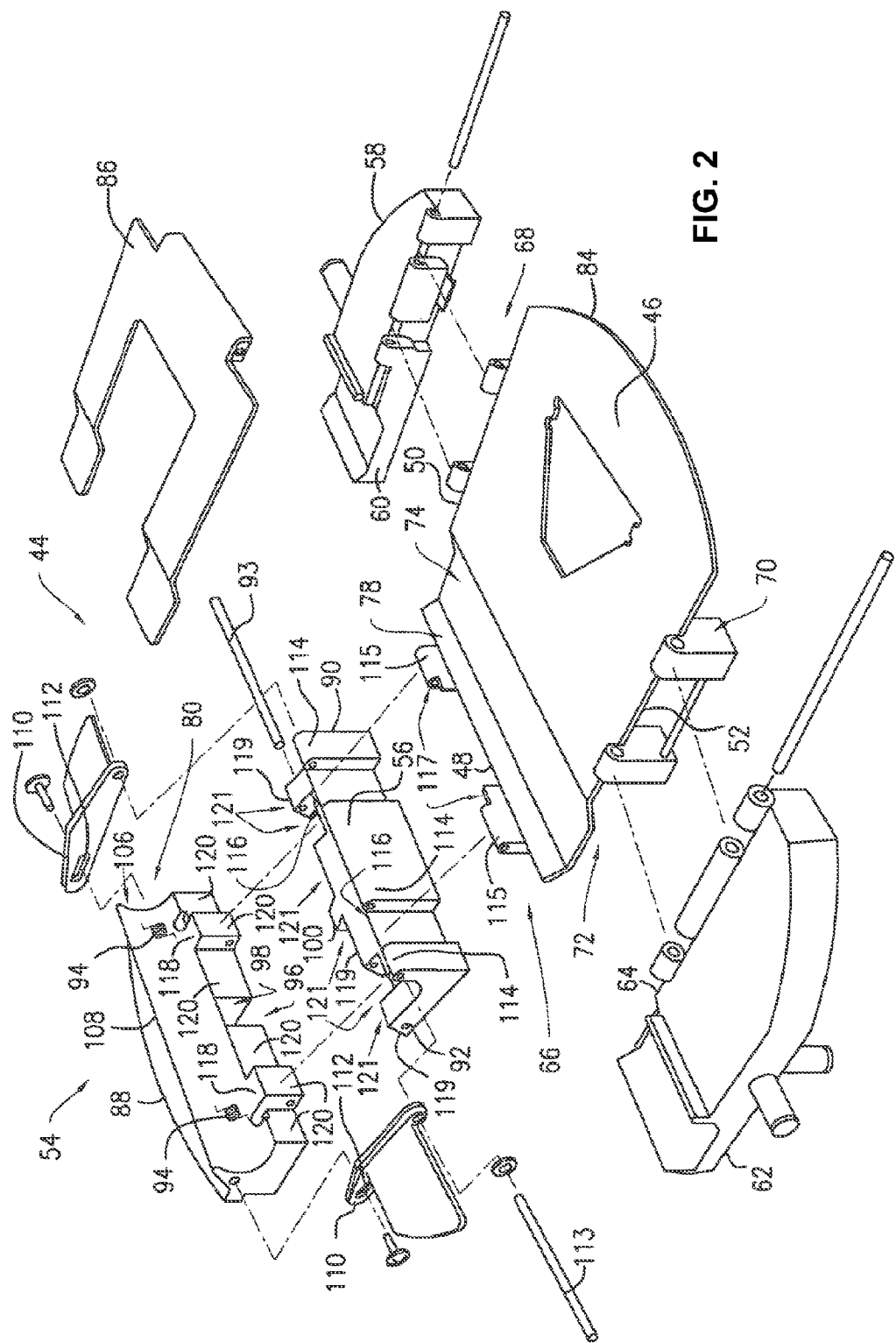
FIG. 2 is an exploded, top perspective view of the folding platform of FIG. 1.

A first embodiment is shown in FIGS. 1-8. Referring to FIGS. 1 and 2, a substantially circular folding platform 44 is shown. The folding platform 44 includes a substantially planar base 46 having first, second and third linear edges 48, 50, 52, respectively; a first flap 54 having a linear edge 56; a second flap 58 having a linear edge 60; a third flap 62 having a linear edge 64; and first, second, and third hinges 66, 68, 70 respectively disposed between the first, second, and third linear edges 48, 50, 52 of the base 46 and the linear edges 56, 60, 64 of the first, second, and third flaps 54, 58, 62. The first, second, and third flaps 54, 58, 62 are pivotally mounted to the base 46 via the first, second, and third hinges 66, 68, 70, respectively. The second and third linear edges 50, 52 of the base 46 are substantially parallel to each other, and each one is each substantially perpendicular to the first linear edge 48 of the base 46. The folding platform 44 further includes a channel-shaped depression 72 formed from corresponding portions of the base 46 and the second and third flaps 58, 62. The depression 72 has a bottom surface 74 and first and second beveled side walls 76, 78, respectively. The first flap 54 includes a pocket 80 and a first follower 82 that extends beyond the periphery of the first flap 54. The base 46 further includes a distal edge 84, which is opposite the first linear edge 48, and a lift arm 86, which is pivotally mounted on the base 46 in the vicinity of the distal edge 84.

Referring to FIGS. 1 and 2, the first flap 54 includes cooperating upper and lower flap members 88, 90 that are pivotally connected to each other about a fourth hinge 92 disposed between the upper and lower flap members 88, 90. As such, the first flap 54 is distinguished from the second and third flaps 58, 62 at least in that the first flap 54 is an articulated flap, whereas the second and third flaps 58, 62 include no internal articulation. The fourth hinge 92 includes a pintle 93, and the first flap 54 is further equipped with a pair of springs 94 disposed around the pintle 93 and positioned across the fourth hinge 92 between the upper and lower flap members 88, 90. The upper flap member 88 is equipped with a cavity 96 and a reaction surface 98, while the lower flap member 90 is equipped with a stop 100. The springs 94 are mounted on the fourth hinge 92 so as to bias the reaction surface 98 of the upper flap member 90 against the stop 100 of the lower flap member 90, in which position the stop 100 occupies the cavity 96 in the upper flap member 90. The first flap 54 is therefore biased so as to assume, in the absence of a force sufficient to defeat the spring bias, a substantially flat configuration (e.g., wherein the upper and lower flap members 88, 90 occupy a common plane).

The cooperating upper and lower flap members 88, 90 include respective pocket surfaces 102, 104 which together define the pocket 80 of the first flap 54. The upper flap member 88 is further equipped with a protruding ridge 106 having an edge 108. The first flap 54 further includes a pair of guide bars 110, 110 spanning the width of the pocket 80 (i.e., from a location proximate the edge 108 of the ridge 106 to the linear edge 56 of the first flap 54 where the latter hingedly connects to the base 46). The guide bars 110, 110 are disposed at opposite ends of the ridge 106, and thereby define respective lengthwise ends of the pocket 80.

The shape of the pocket 80 (i.e., as viewed in the direction of the first and fourth hinges 66, 92) changes depending on the positions of the upper and lower flap members 88, 90 relative to each other. The distance between the ridge 106 of the upper flap member 88 and the linear edge 56 of the first flap 54 therefore tends to change in relation to the changes in the shape of the pocket 80. For this reason, the guide bars 110, 110 are pivotally connected to the lower flap member 90 and have a sliding (i.e., via a slot 112) and pivoting connection with the upper flap member 90. The guide bars 110, 110 help to guide and coordinate the movements of the upper and lower flap members 88,90 relative to each other. The structure and function of the first flap 54 will be discussed in more detail hereinafter.

The first hinge 66 of the folding platform 44 is equipped with a pintle 113, three knuckles 114 on the linear edge 56 of the first flap 54, two knuckles 115 on the first linear edge 48 of the base 46, and contact surfaces 116, 117 on one of the knuckles 114 and on two of the knuckles 115, respectively, which engage with each other when the lower flap member 90 rotates sufficiently toward the depression 72 in the base 46. More specifically, and referring in particular to FIG. 1, the contact surfaces 116 of the lower flap member 90 and the contact surfaces 117 of the base 46 are part of the first hinge 66 and serve to limit the movement of the lower flap member 90 toward the depression 72 in the process of creating a first fold, as described in more detail hereinafter. In addition, the fourth hinge 92 of the folding platform 44 is equipped with two knuckles 118 on the upper flap member 88, three knuckles 119 on the lower flap member 90, and contact surfaces 120, 121 on and adjacent to the knuckles 118, 119, respectively, which engage with each other to prevent over-rotation of the upper flap member 88 with respect to the lower flap member 90 in a direction opposite the bias direction of the springs 94. The significance of these and other features of the folding platform 44 will be discussed in more detail hereinafter.

Referring to FIGS. 1-6, the folding platform 44 may be used to create the folds disclosed by U.S. Pat. Nos. 7,487,718 and 5,912,035, plus an additional fold, resembling a tuck or "pinch," disclosed by U.S. Pat. No. 7,487,718.

Figure 3:
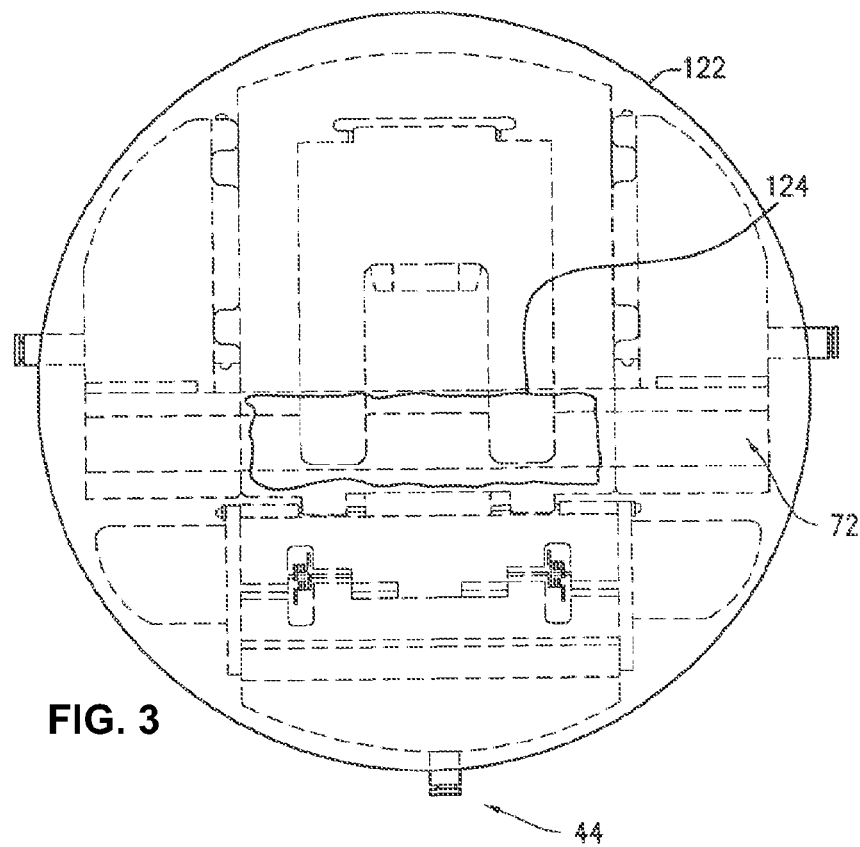
FIG. 3 is a top plan view of the folding platform of FIG. 1 in which a tortilla has been placed on the folding platform, and a food filling has been deposited on the tortilla in preparation for subsequent folding of the tortilla.
Figure 4:
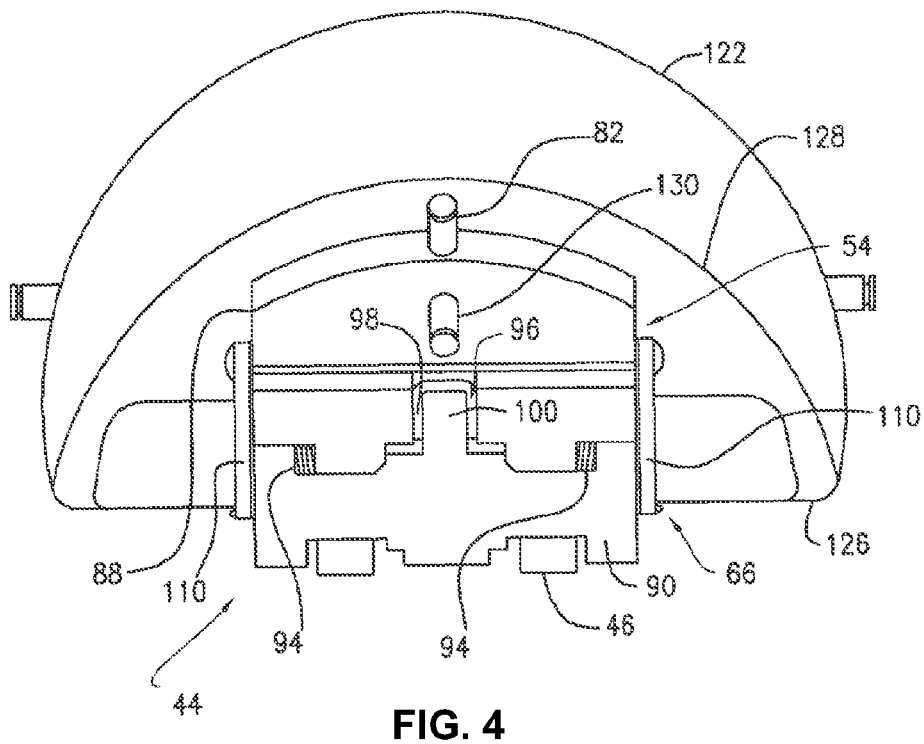
FIG. 4 is a top plan view of the folding platform of FIGS. 1 and 3 with the articulated first flap in its first folding position.

In operation, and referring initially to FIG. 3, filling and folding of a tortilla 122 begins with the tortilla 122 being placed or draped on the folding platform 44 in a more or less centered position, after which a portion 124 of food filling is deposited on the tortilla 122 above the approximate location of the depression 72 in the base 46. Conveyors (not shown), such as those of the system described in the U.S. Pat. No. 5,912,035, then rotate and move the folding platform 44 along a series of rod-like cams (not shown). After proper rotation of the folding platform 44 on the conveyor (not shown), the rod-like cam or other automated lifting mechanism (not shown) engages the first follower 82 mounted to the upper flap member 88. As shown in FIGS. 4 and 5, lifting of the first follower 82 rotates the first flap 54 about the first hinge 66 in a pivoting motion with respect to the base 46, ultimately causing the first flap 54 to overlay the base 46. This creates a first fold 126, whereby a first side 128 of the tortilla 122 is folded more or less entirely over the food filling portion 124 (see FIGS. 4-6).

While creating the first fold 126 as described above, the first flap 54 remains in a substantially planar orientation (i.e., the upper and lower flap members 88, 90 are kept substantially coplanar). Also, the full lengths of the guide bars 110, 110 are utilized. The bias force of the springs 94 predominates, and the stop 100 of the lower flap member 90 occupies the cavity 96 of the upper flap member 88 and abuts the reaction surface 98, keeping the first flap 54 at least temporarily rigid. Further, the corresponding contact surfaces 116, 117 (FIGS. 1-2) of the lower flap member 90 and the base 46 meet so as to limit the rotation of the lower flap member 90 toward the depression 72 (FIG. 3) to the degree shown in FIG. 5.

Following the formation of the first fold 126, a rod-like cam or other automated urging mechanism of the machine (not shown) engages either the first follower 82 or a second follower 130 (see FIGS. 4 and 5) mounted to the upper flap member 88, which causes the upper flap member 88 to continue rotating toward the depression 72 (see FIG. 3), while the orientation of the lower flap member 90 with respect to the depression 72 remains fixed. Referring to FIG. 6 (wherein the guide bar 110 is shown in phantom for the sake of clarity), as the upper flap member 88 of the first flap 54 rotates downward against the biasing force of the springs 94 (see FIG. 4), the edge 108 of the upper flap member 88 begins to tuck a portion of the first side 128 of the tortilla 122 underneath the food filling portion 124 contained within the tortilla 122. As shown in FIG. 6, when the upper flap member 88 reaches the end of its allowable range of motion in this regard (i.e., when the contact surfaces 120, 121 of the upper and lower flap members 88, 90 meet and prevent further rotation), a second fold 132 will have been formed opposite and parallel to the first fold 126, thereby creating a type of seal to keep the food filling portion 124 from leaking out of the partially-filled tortilla 122 during upcoming folding steps involving other sides of the tortilla 122. The guidebars 110, 110 accommodate the resulting decrease in distance between the ridge 106 and the first hinge 66 by means of the slot 112. In addition, the lift arm 86 can be biased (not specifically shown) so as to extend in cantilever slightly above the surface of the depression 74 so as to hold the partially-filled tortilla slightly above the depression 74. In accordance with this latter configuration, the edge 108 of the upper flap member 88 is permitted to begin folding and tucking the first side 128 of the tortilla 122 without interference from the surface of the depression 74 (i.e., with the partially-filled tortilla 122 so suspended), resulting, potentially, in the seal provided by the second fold 132 having increased integrity. The lift arm 86 flexes downward (not shown) into contact with the surface of the depression 74 via urging from the edge 108 of the upper flap member 88 as the upper flap member 88 completes its range of motion into the depression 74.

Figure 7:
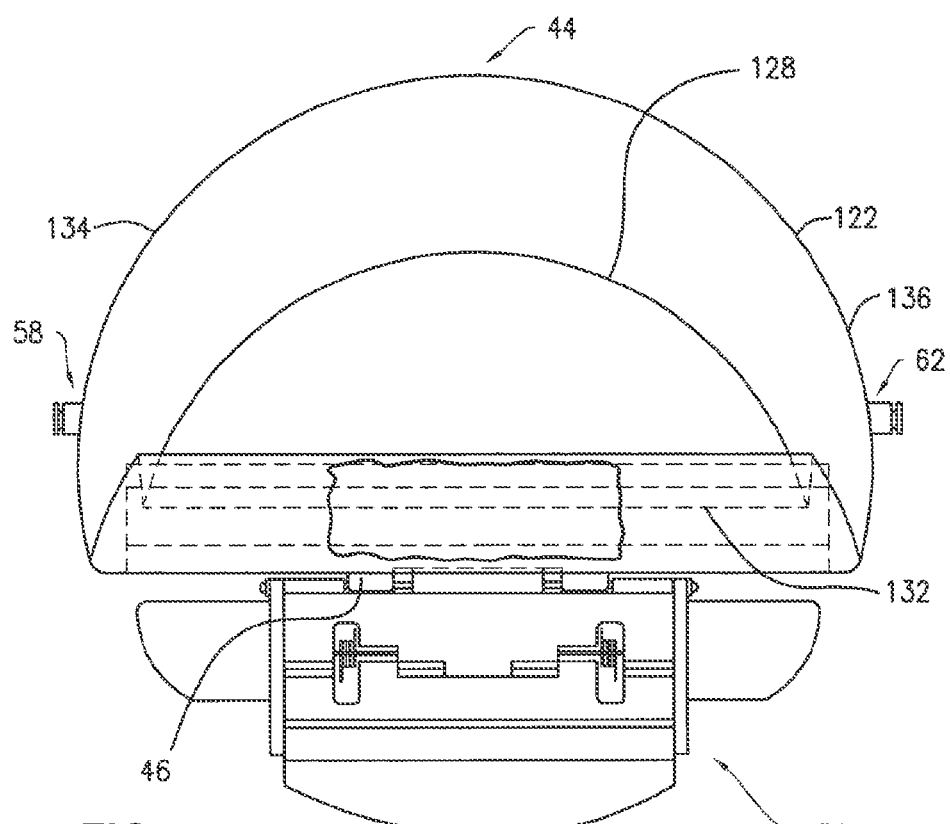
FIG. 7 is a top plan view of the folding platform of FIGS. 1 and 3 with the articulated first flap returned to its starting position after having created two folds in the filled tortilla.

After the second fold 132 is made, the first and/or second followers 82, 130 are relieved of the downward urging force. As a result, the biasing force of the springs 94 (FIG. 1), which is once again predominant, rotates the upper flap member 88 back to its coplanar position with respect to the lower flap member 90, as shown in FIG. 5. Additional urging forces applied to the first and/or second followers 82, 130 cause the first flap 54 to rotate back to its coplanar position with respect to the base 46, as shown in FIGS. 1 and 7. Referring to FIG. 7, the second fold 132 extends almost the entire width of the first side 128 of the tortilla 122. With the first flap 54 of the folding platform 44 now fully retracted, the second and third flaps 58, 62 (see FIG. 1) can now be used to respectively fold a second side 134 and a third side 136 of the tortilla 122.

Figure 8:
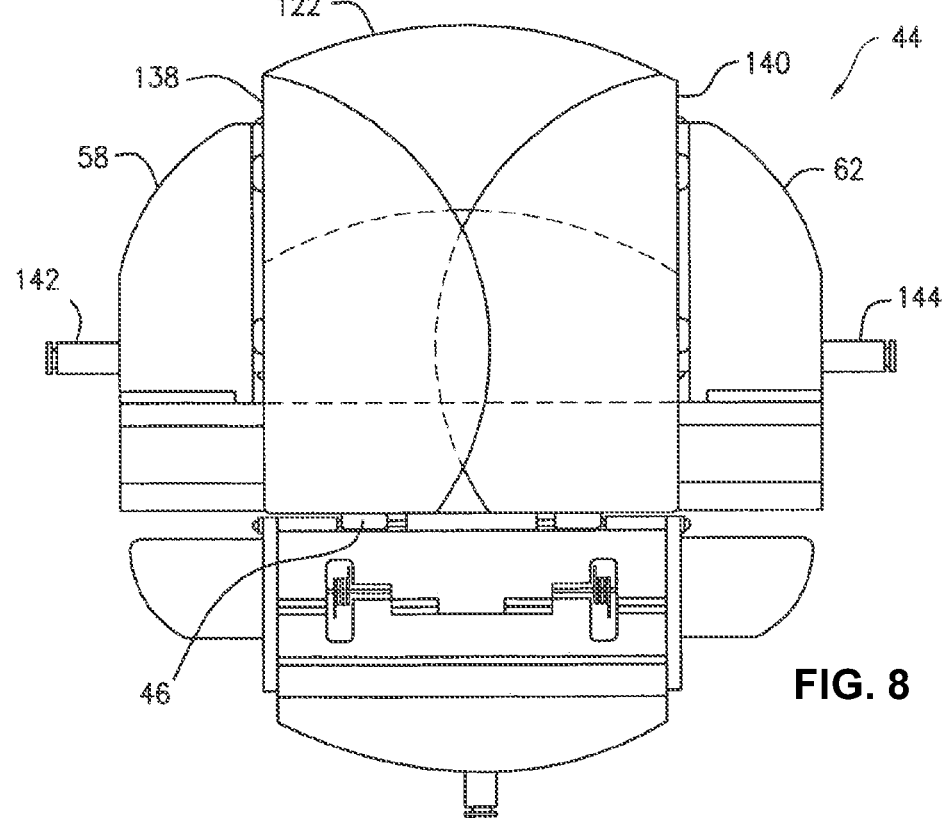
FIG. 8 is a top plan view of the folding platform of FIGS. 1 and 7 with the second and third flaps returned to their starting positions after having created respective additional folds in the filled tortilla.

As shown in FIG. 8, third and fourth folds 138, 140 of the tortilla 122 are made by action of the second and third flaps 58, 62. After proper rotation of the folding platform 44 on the conveyor (not shown), a rod-like cam or other automated lifting mechanism on the machine (not shown) engages respective third and fourth followers 142, 144 attached to the second and third flaps 58, 62, thereby causing the latter to rotate/overturn (not separately shown) with respect to the base 46 and to create the third and fourth folds 138, 140. Following the creation of the third and fourth folds 138, 140, which are perpendicular to the first and second folds 126, 132 and which overlap the first and second folds 126, 132, the second and third flaps 58, 62 are rotated away from the base 46 of the folding platform 44. The partially-folded, filled tortilla 122 is now ready for transfer from the folding platform 44 to other automated devices (e.g., an automated grip-and-flip device) for the administration of the final folding steps (not shown).

A second embodiment is illustrated in FIGS. 9-13, and as described above, does not show the lift arm and lift arm linkage assembly, and/or the removable ridge insert of the present disclosure, but is provided for context. Elements illustrated in FIGS. 9-13 which correspond substantially to the elements described above with reference to FIGS. 1-8 have been designated with corresponding reference numerals increased by an increment of one thousand. The embodiment shown in FIG. 9-13 operates and is constructed consistent with the foregoing description of the folding platform 44, unless it is stated otherwise.

Figure 9:
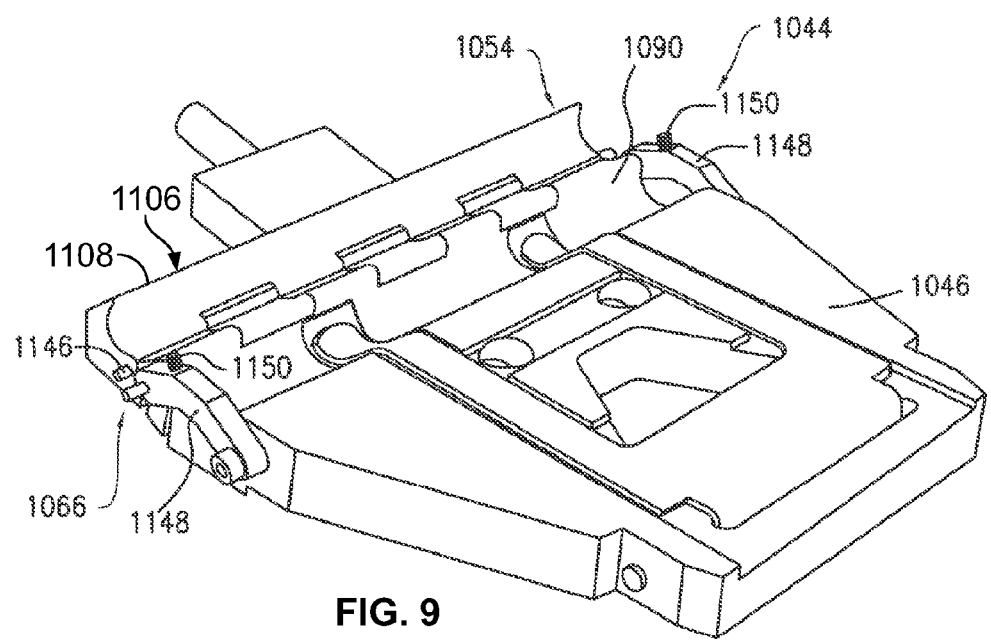
FIG. 9 is a top perspective view of a folding platform for filled taquito shells constructed in accordance with a second embodiment.
Figure 10:
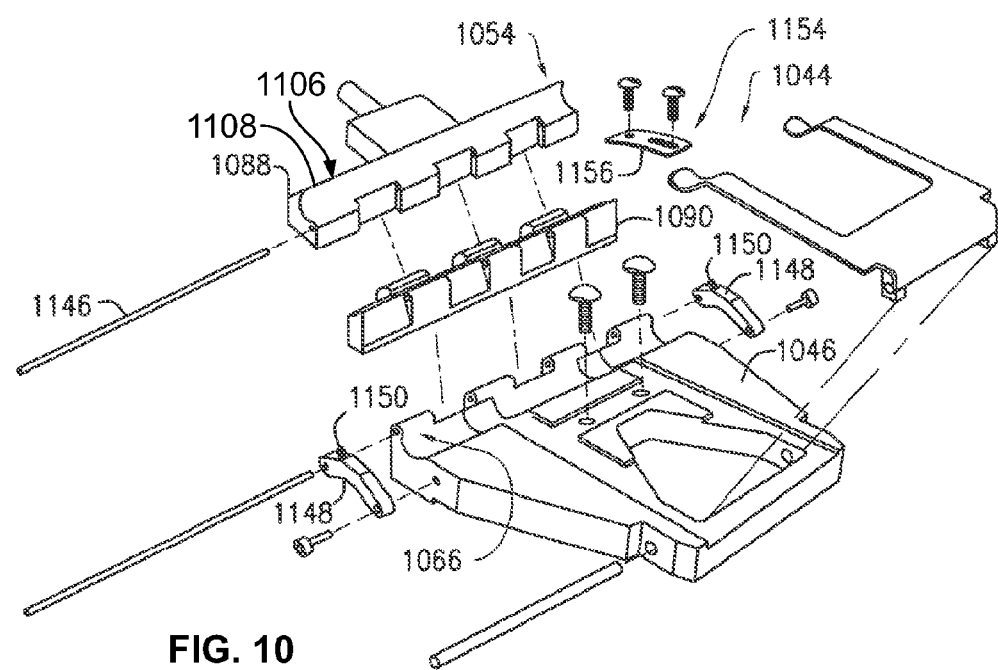
FIG. 10 is an exploded, top perspective view of the folding platform of FIG. 9.

Referring to FIGS. 9 and 10, a folding platform 1044 for filling and folding taquito shells is illustrated. The folding platform 1044 has a substantially planar base 1046 and a first flap 1054 which is articulated. However, since this embodiment is more ideal for small, open-ended folded food products, such as taquitos and the like, which have less filling and require fewer folds then a burrito, the folding platform 1044 lacks rigid second and third flaps for creating the above-described third and fourth folds.

Figure 11:
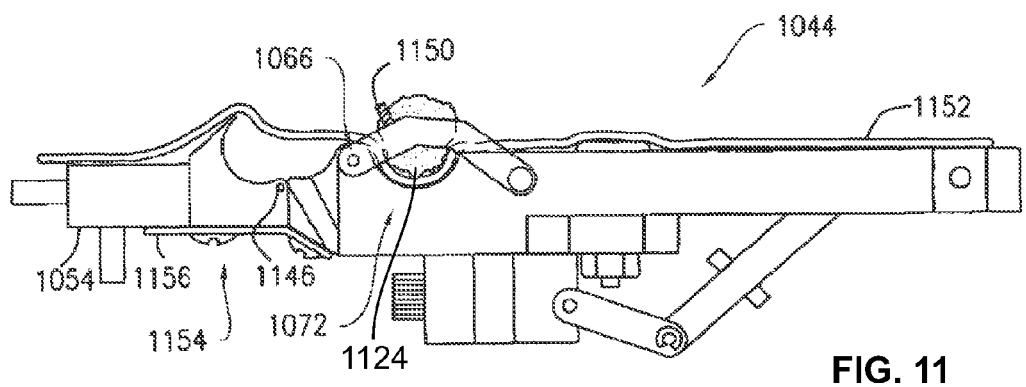
FIG. 11 is a side elevational view of the folding platform of FIG. 9 in which a taquito shell has been placed on the folding platform, and a food filling has been deposited on the taquito shell in preparation for subsequent folding of the taquito shell.
Figure 12:
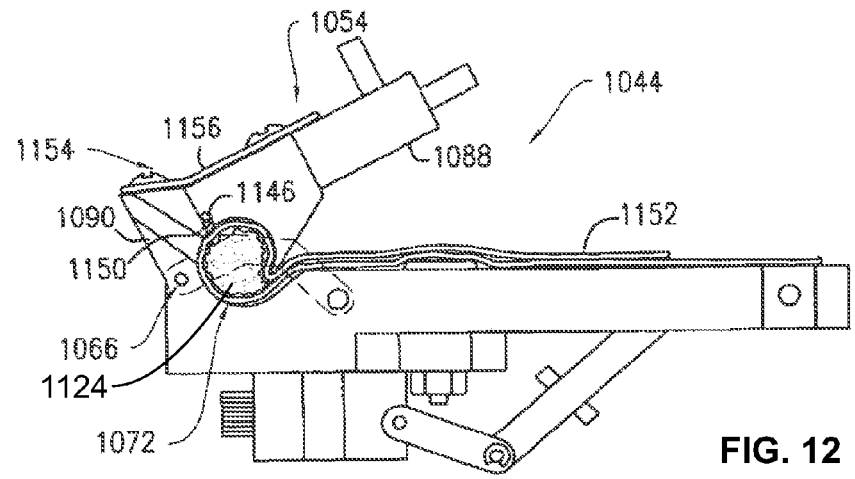
FIG. 12 is a side elevational view of the folding platform of FIGS. 9 and 11 with the articulated first flap in its first folding position.

The folding platform 1044 includes a somewhat different stop mechanism for preventing over-rotation of the lower flap member 1090 of the first flap 1054 relative to the base 1046. The first hinge 1066 includes a pintle 1146 that protrudes to a small degree from both sides of the first hinge 1066, and two brackets 1148 equipped with set screws 1150 mounted in fixed positions and extending upward from the brackets 1148. As shown in FIGS. 11 and 12, when the first flap 1054 is rotated about the first hinge 1066 toward the depression 1072, each end of the pintle 1146 rotates down until it strikes one of the set screws 1150, thereby preventing further rotation of the lower flap member 1190.

Figure 13:
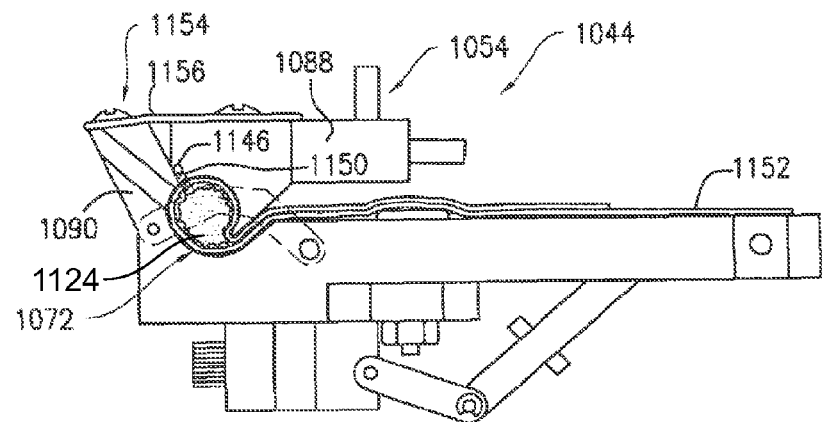
FIG. 13 is a side elevational view of the folding platform of FIGS. 9 and 11 with the articulated first flap in its second folding position.

The upper and lower flap members 1088, 1090 have no contact surfaces to prevent over-rotation of the upper flap member 1090 toward the depression 1072. However, the folding platform 1044 does include a biasing mechanism for causing the upper flap member 1088 to retract after creating a second fold 1132 in a taquito shell 1152. The biasing mechanism is not a coil spring, like the springs 94 of the first exemplary embodiment, but rather consists of a spring 1154 in the form of a steel leaf 1156 disposed between the upper and lower flap members 1088, 1090. As shown in FIGS. 12 and 13, to the extent that the upper flap member 1090 rotates downward toward the depression 1072 after the lower flap member 1088 has reached the limit of its rotation, the spring 1154 deflects, storing energy for retracting the upper flap member 1088 back into planar alignment with the lower flap member 1090, such deflection being accomplished upon the release of the upper flap member 1088 from the downward urging force.

It should be appreciated that the embodiments of the above disclosure provides numerous advantages. For instance, the articulated first flap 54/1054 facilitates more efficient folding of food products. More particularly, the "pinch-like" fold administered to the tortilla/taquito shell by the edge 108/1108 of the ridge 106/1106 of the upper flap member 88/1088 of the first flap 54/1054 secures the food filling portion 124/1124 inside of the partially-folded food product. When the food filling portion 124/1124 is thereby secured, the lifting and transfer of the partially-folded food product from the folding platform 44/1044 to the additional conveyor (not shown) is much less likely to result in unfolding and/or loss of any of the food filling portion 124/1124.

It is also believed that the folding platform 44/1044 simplifies folded food production overall. More particularly, by delivering the "pinch-like" fold to the food product, the articulated first flap 54/1054 may make later pinching by devices, such as an adjustable driven roller (not shown), unnecessary. In other words, because the pinching step is administered while the food product is still on the folding platform 44/1044, the step of transferring the partially-folded food product to the adjustable driven roller may be obviated. Once pinched, the food product can be transferred from the folding platform 44/1044 directly to folding jaws (not shown) for final folding and completion of the folded food product. Consequently, the efficiency of the folding process is enhanced.

It will be understood that the embodiments described herein are merely exemplary, and that a person skilled in the art may make many variations and modifications without departing from the spirit and scope thereof. For example, the order of the first, second, third and fourth folds 126, 132, 138, 140 can be changed to perform the "pinch"-type fold (i.e., the second fold 132) after all the first, second and third sides 128, 134, 136 have been folded (i.e., after the first, third and fourth folds 126, 138, 140). All such variations and modifications, including those discussed hereinabove, are intended to be included within the scope of the disclosure.

Figure 14:
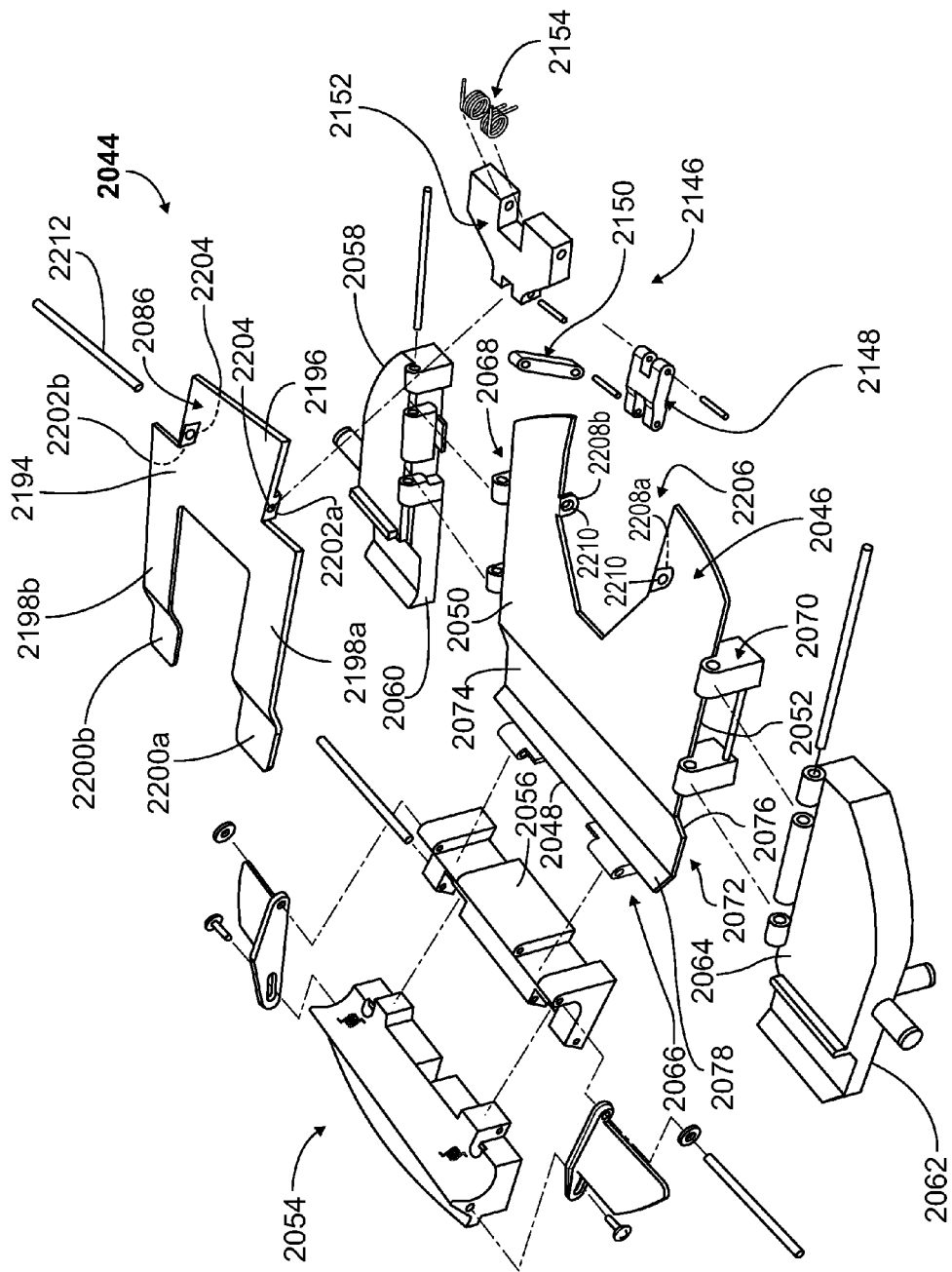
FIG. 14 is an exploded top perspective view of a folding platform constructed in accordance with a third embodiment.
Figure 15:
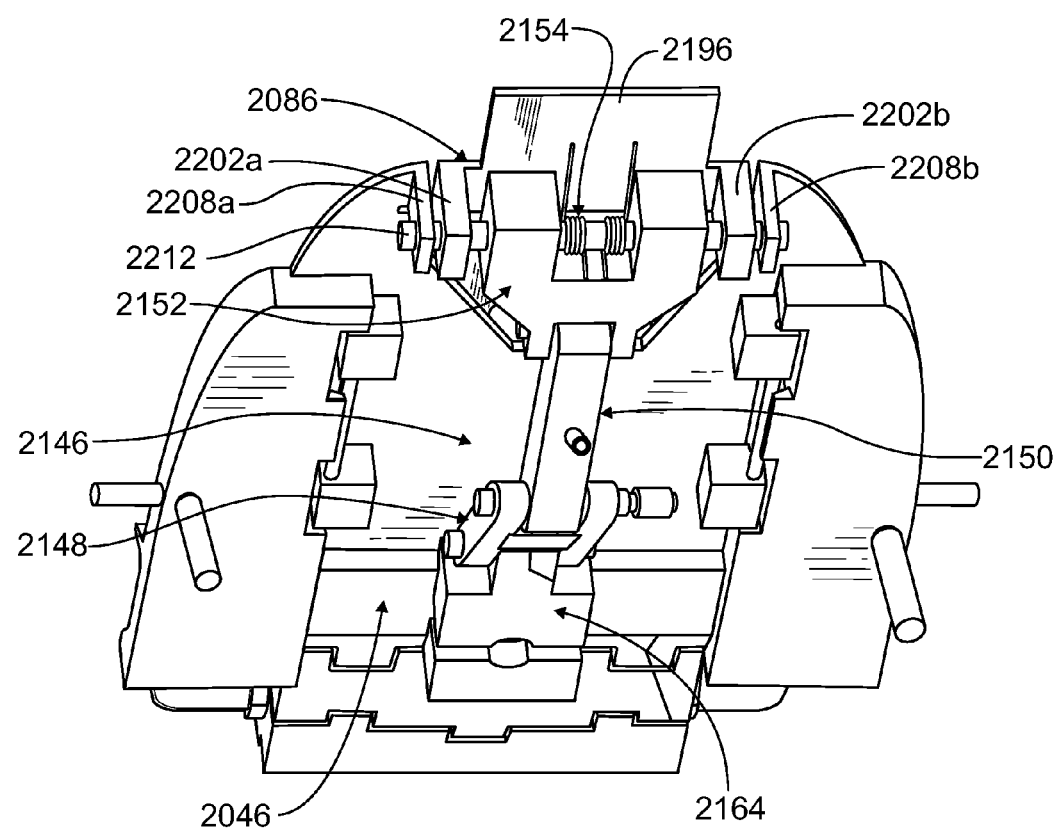
FIG. 15 is a bottom perspective view of the folding platform of FIG. 14.

In a third embodiment, a folding platform is provided with a spring-biased lift arm for preventing damage to the folding platform. First turning to a three-flap folding platform embodiment, FIGS. 14 and 15 illustrate a folding platform 2044 that includes a spring-biased lift arm. Elements illustrated in FIGS. 14 and 15 that correspond substantially to the elements described above with reference to FIGS. 1-8 have been designated with corresponding reference numerals increased by an increment of two thousand. The embodiment of the present disclosure shown in FIGS. 14 and 15 operates and is constructed consistent with the foregoing description of the folding platform 44, unless it is stated otherwise. Particularly, the embodiment of the folding platform 2044 of FIGS. 14 and 15 includes the addition of a lift arm that is spring-biased with a lift arm linkage assembly 2146, which is discussed in greater detail below. As described above, the lift arm, in combination with the lift arm linkage assembly, is capable of rotating an extended rotational distance when it comes in contact with an obstruction. Such inhibits the lift arm from being undesirably manipulated or damaged. Additionally, the lift arm linkage assembly spring biases the lift arm so that the lift arm returns to an original position when the obstruction is no longer in contact with the lift arm.

FIG. 14 is an exploded top perspective view of the folding platform 2044. The folding platform 2044 can be used for filling and folding food items such as burrito shells, eggroll shells, grape leaves, etc., is illustrated. The folding platform 2044 includes a substantially planar base 2046 having first, second, and third linear edges 2048, 2050, 2052, respectively, a first flap 2054 having a linear edge 2056, a second flap 2058 having a linear edge 2060, and a third flap 2062 having a linear edge 2064. The folding platform 2044 additionally includes first, second, and third hinges 2066, 2068, 2070 respectively disposed between the first, second, and third linear edges 2048, 2050, 2052 of the base 2046 and the linear edges 2056, 2060, 2064 of the first, second, and third flaps 2054, 2058, 2062. The first, second, and third flaps 2054, 2058, 2062 are pivotally mounted to the base 2046 via the first, second, and third hinges 2066, 2068, 2070, respectively. The second and third linear edges 2050, 2052 of the base 2046 are substantially parallel to each other, and each one is substantially perpendicular to the first linear edge 2048 of the base 2046. The folding platform 2044 further includes a channel-shaped depression 2072 formed from corresponding portions of the base 2046 and the second and third flaps 2058, 2062. The depression consists of a bottom surface 2074 and first and second beveled sidewalls 2076, 2078, respectively.

The base 2046 is substantially similar to the base 46 of FIGS. 1 and 2; however, the base 2046 does not include the distal edge 84 as illustrated in FIGS. 1 and 2, but, instead, includes a distal gap 2206 that is opposite the first linear edge 2048. As discussed below, this gap 2206 provides a space for components of the lift arm linkage assembly 2146, e.g., a resting insert 2152 described below, and a back plate 2196 of the lift arm 2086. For example, when the lift arm 2086 is lifted, the back plate 2196 will rotate into the distal gap 2206. The distal gap 2206 extends toward the center of the base 2046. The base 2046 includes first and second mounting tabs 2208a, 2208b positioned on lateral sides of the distal gap 2206 that extend transversely from the base 2046. The first and second mounting tabs 2208a, 2208b are parallel to one another and each include a hole 2210 extending therethrough.

The folding platform 2044 includes a spring-biased lift arm 2086 that is pivotally mounted on the base 2046 in a fashion different than that of FIGS. 1-8. That is, the lift arm 2086 is mounted to the folding platform 2044 such that the lift arm 2086 is spring biased, allowing the lift arm 2086 to rotate over 180 degrees from an original resting position, e.g., a position where the lift arm 2086 lies substantially flat with the base 2046, and automatically return back to it's original position. This degree of motion can occur when the folding platform 2044 is utilized on a conveyor machine 3220, such as that shown in FIG. 19. During operation the lift arm 2086 of the folding platform 2044 is lifted to transfer a food item from the folding platform 2044 to a removal assembly 3222. For example, the lift arm 2086 can be rotated by forty-five degrees with respect to the base 2046. During this transfer the lift arm 2086 may contact a component of the removal assembly 3222, causing the lift arm 2086 to rotate more than forty-five degrees, e.g., ninety degrees, one-hundred and eighty degrees, or more.

Figure 19:
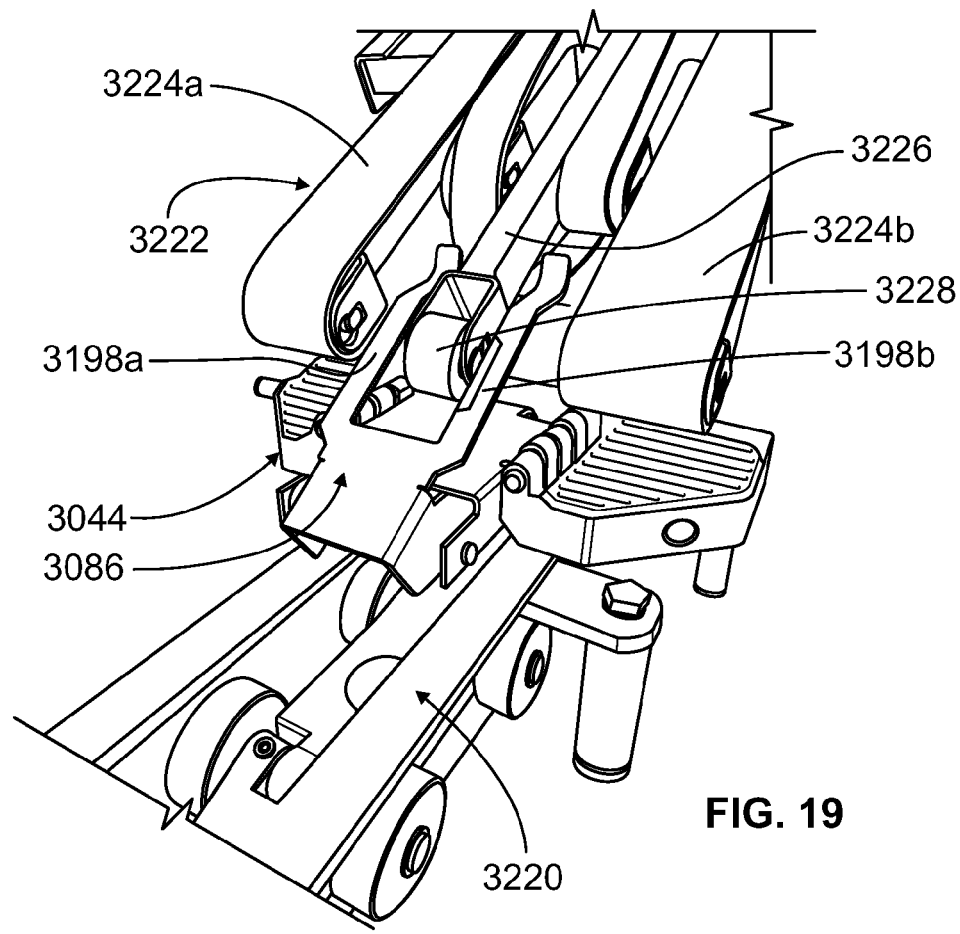
FIG. 19 is a perspective view of the folding platform of FIG. 16 on a conveyor machine showing the clearances between the folding platform lift arm and the machine's components.

The lift arm 2086 is a fork-shaped component. Specifically, an embodiment of the lift arm 2086 includes a substantially planar body 2194, a back plate 2196 that extends from and is substantially coplanar with the body 2194, first and second fork prongs 2198a, 2198b that extend from and are substantially coplanar with the body 2194, depressed regions 2200a, 2200b that extend from from the prongs 2198a, 2198b, and first and second brackets 2202a, 2202b that extend transversely from lateral sides of the lift arm 2086. The first and second brackets 2202a, 2202b each include a hole 2204 that extends transversely therethrough. The depressed regions 2200a, 2200b extend from an end of the first and second fork prongs 2198a, 2198b and are configured to fit within, and have a substantially similar profile to, a depression 2072 of the base 2046. The depressed regions 2200a, 2200b are configured to support a food item so that the food item can be lifted by the lift arm 2086 and transferred to a removal assembly during manufacture of the food item. For example, this is shown in FIG. 19, which is described below in connection with the fourth embodiment.

FIG. 15 is a bottom perspective view of the folding platform 2044 showing a lift arm linkage assembly 2146 connected with the lift arm 2086. The lift arm linkage assembly 2146 includes an H-shaped linkage 2148, a connecting rod 2150, a resting insert 2152, and one or more springs 2154. The base 2046 includes a mounting block 2164 that extends from a bottom of the base 2046. The mounting block 2164 facilitates attachment of the lift arm linkage assembly 2146 to the base 2046. Particularly, the lift arm linkage assembly 2146 is connected with the base 2046 by way of a connection between the H-shaped linkage 2148 and the mounting block 2164. The lift arm linkage assembly is also connected with the lift arm 2086 and the distal end of the base 2046. Particularly, the resting insert 2152 is rotatably connected with the first and second mounting tabs 2208a, 2208b of the base 2046, and the first and second brackets 2202a, 2202b of the lift arm 2086 by a pin 2212 that extends through each of these components. The springs 2154 engage the resting insert 2152 and the back plate 2196 of the lift arm 2086 to rotationally bias the lift arm 2086 into a position adjacent to the base 2046. The springs 2154 are preferably torsion springs, but any suitable biasing means are contemplated.

The foregoing description provide in connection with FIGS. 14 and 15 describes the lift arm linkage assembly and its connection with a first example of a folding platform. However, a more detailed description of the lift arm linkage assembly is provided below in connection with FIGS. 16-20 that illustrate another example of a folding platform. Accordingly, it should be understood that the lift arm and lift arm linkage assembly of the present disclosure is not limited in application to one type of folding platform, or a folding platform having a specific arrangement of flaps, but instead can be utilized on different types of folding platforms.

FIGS. 16-20 further illustrate the lift arm and lift arm linkage. Elements illustrated in FIGS. 16-20 that correspond substantially to the elements described above with reference to FIGS. 1-8 have been designated with corresponding reference numerals increased by an increment of three thousand. The embodiment of the present disclosure shown in FIGS. 16-20 operates and is constructed consistent with the foregoing description of the folding platform 44, unless it is stated otherwise.

Figure 16:
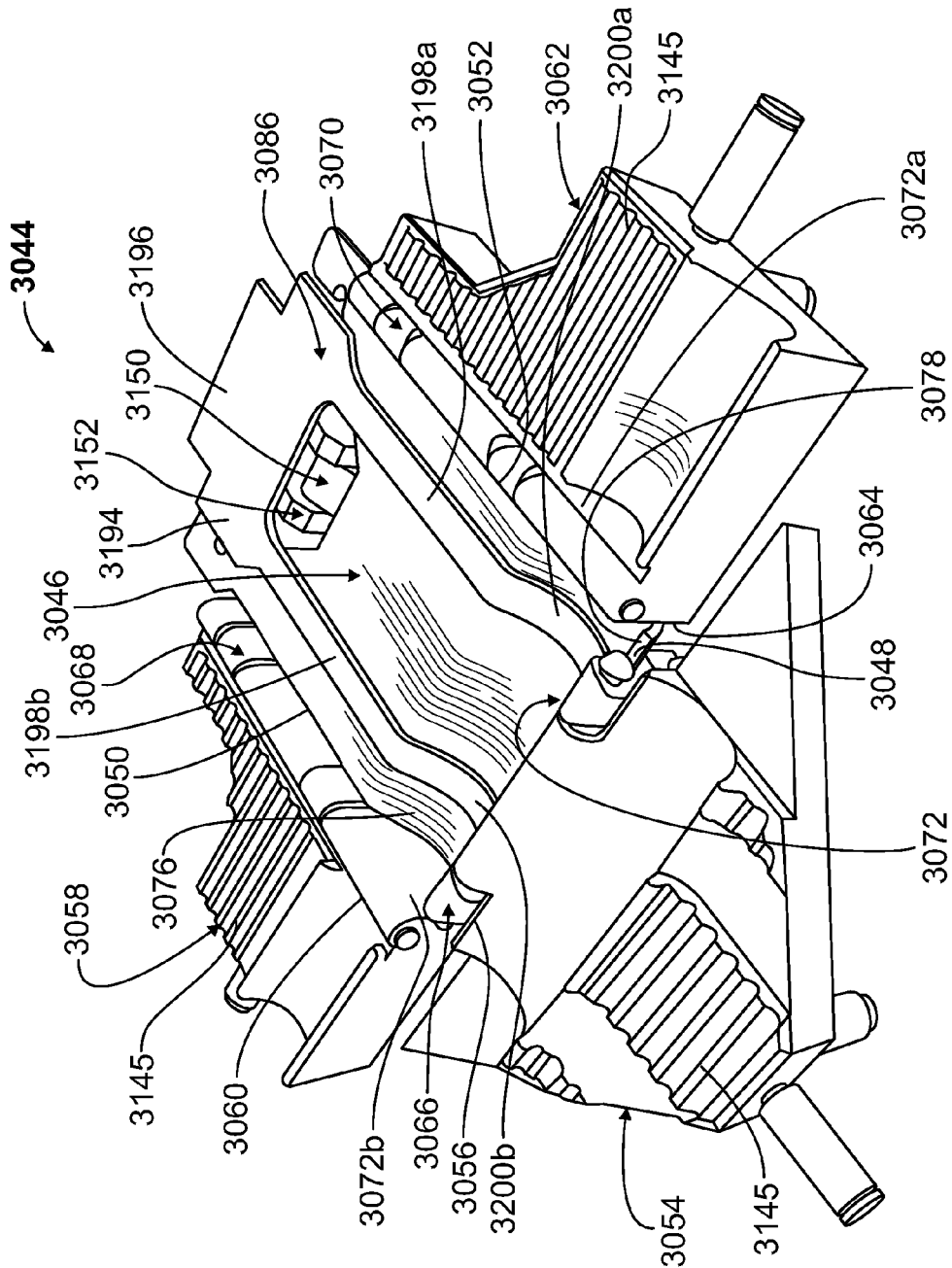
FIG. 16 is a top perspective view of a folding platform constructed in accordance with a fourth embodiment.

FIG. 16 is a top perspective view of a folding platform 3044. The folding platform 3044 can be used for filling and folding food items such as burrito shells, eggroll shells, grape leaves, etc., is illustrated. The folding platform 3044 includes a substantially planar base 3046 having first, second, and third linear edges 3048, 3050, 3052, respectively, a first flap 3054 having a linear edge 3056, a second flap 3058 having a linear edge 3060, and a third flap 3062 having a linear edge 3064. The folding platform 3044 additionally includes first, second, and third hinges 3066, 3068, 3070 respectively disposed between the first, second, and third linear edges 3048, 3050, 3052 of the base 3046 and the linear edges 3056, 3060, 3064 of the first, second, and third flaps 3054, 3058, 3062. The first, second, and third flaps 3054, 3058, 3062 are pivotally mounted to the base 3046 via the first, second, and third hinges 3066, 3068, 3070, respectively. The second and third linear edges 3050, 3052 of the base 3046 are substantially parallel to each other, and each one is substantially perpendicular to the first linear edge 3048 of the base 3046. The folding platform 3044 further includes a channel-shaped depression 3072 formed from corresponding portions of the base 3046 and the second and third flaps 3058, 3062. The depression consists of a bottom surface 3074 and first and second beveled sidewalls 3076, 3078, respectively. The depression 3072 is interrupted by depression sidewalls 3072a, 3072b that are formed in the second and third flaps 3058, 3062, respectively. The depression sidewalls 3072a, 3072b isolate a central portion of the depression 3072 to prevent filling that may be placed in the depression 3072 from exuding outward.

The first, second, and third flaps 3054, 3058, 3062 can include treads 3145 on a top surface thereof that provides added traction for when a food product is placed on the folding platform 3044. For example, where the folding platform 3044 is being used to fold a grape leaf, the grape leaf is placed on the folding platform 3044 where the treads 3145 provides added traction between the grape leaf and the first, second, and third flaps 3054, 3058, 3062 to prevent the grape leaf from sliding on the folding platform 3044.

Figure 17:
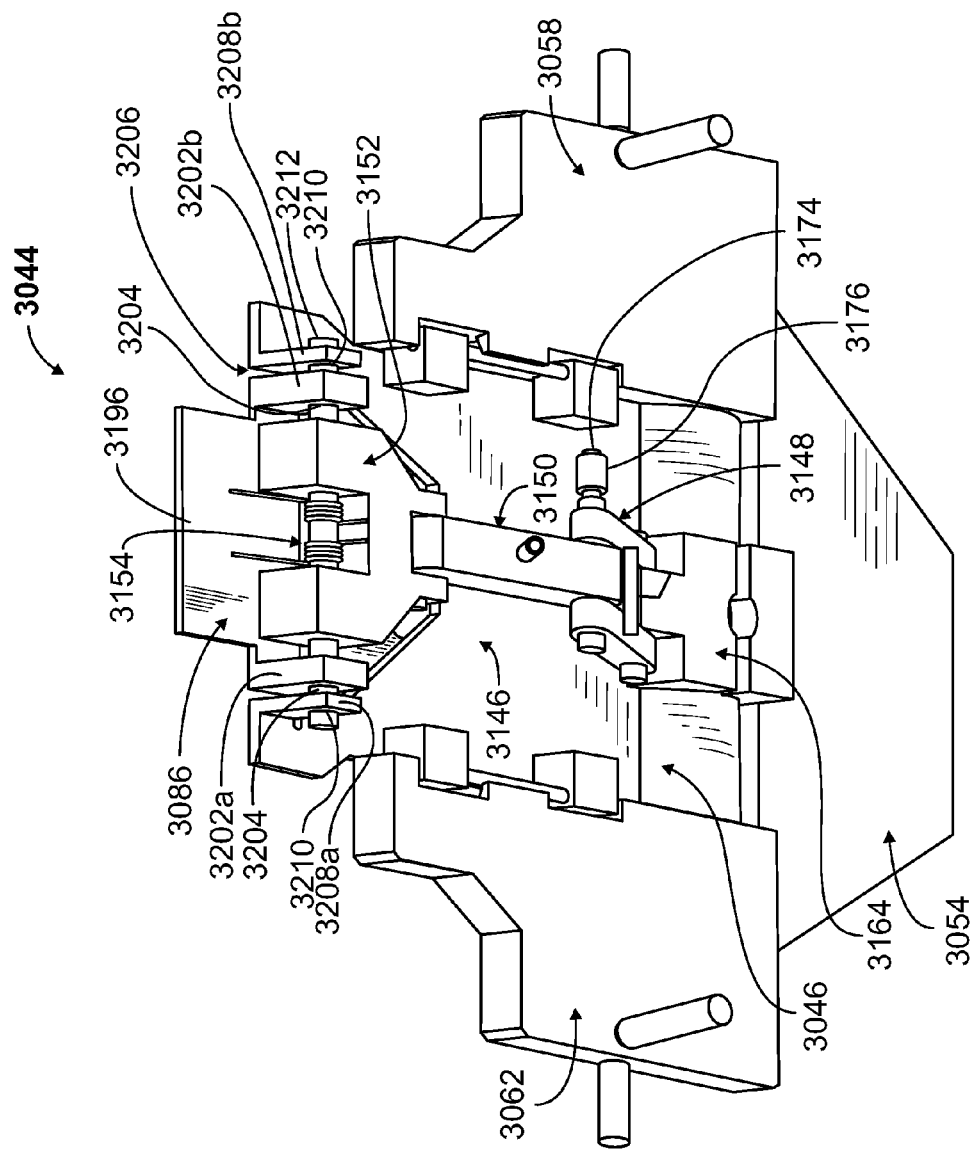
FIG. 17 is a bottom perspective view of the folding platform of FIG. 16.
Figure 18:
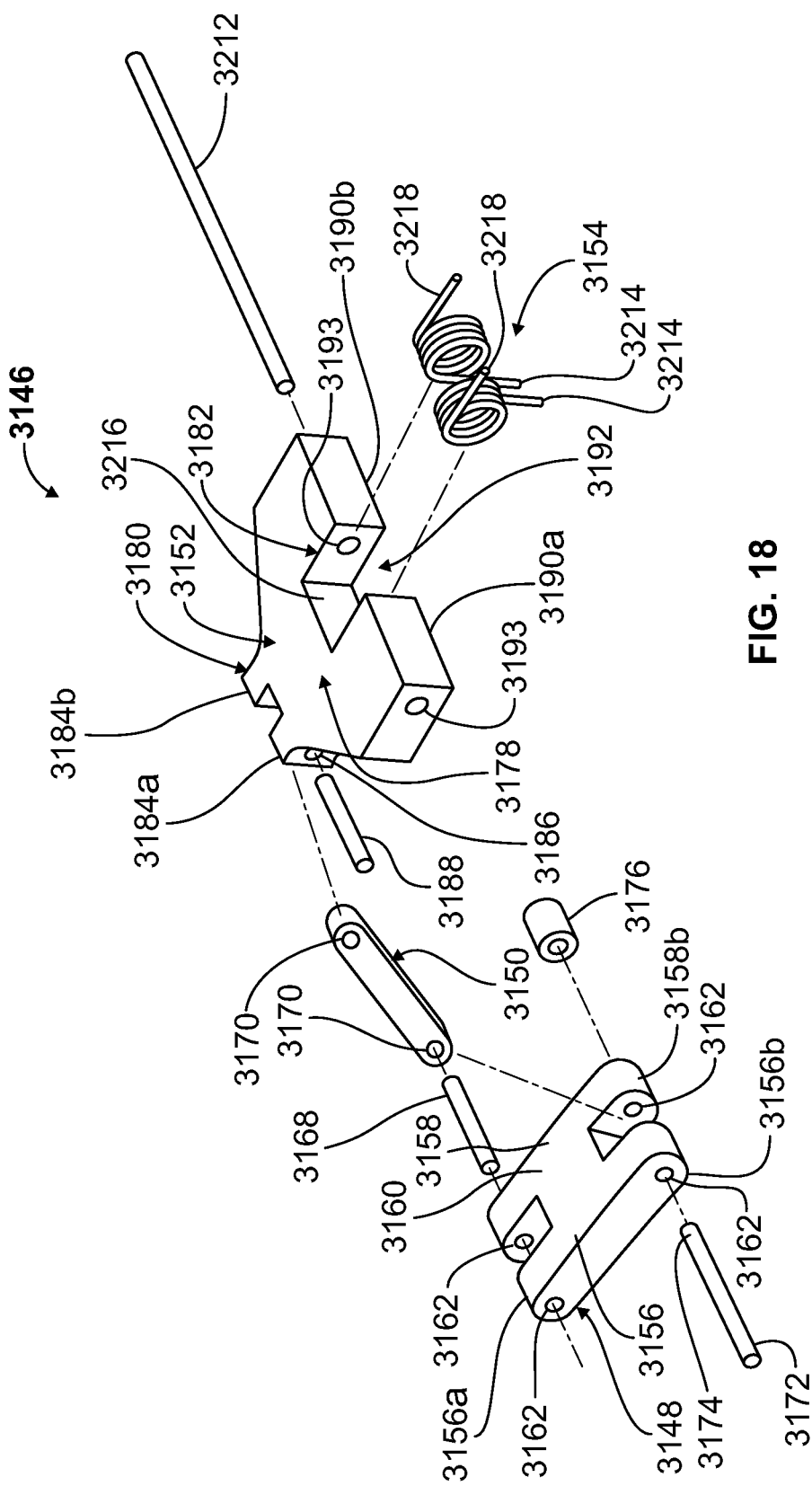
FIG. 18 is an exploded top perspective view of a lift arm linkage assembly of the folding platform of FIG. 16.

The folding platform 3044 includes a lift arm 3086 that is pivotally mounted on the base 3046 in a fashion that is different than that of FIGS. 1-8. That is, the lift arm 3086 is mounted to the folding platform 3044 such that the lift arm 3086 is spring biased, allowing the lift arm 3086 to rotate over 180 degrees from an original resting position, e.g., a position where the lift arm 3086 lies substantially flat with the base 3046 such as that shown in FIG. 16, and automatically return back to it's original position. FIG. 17 is a bottom perspective view of the folding platform 3044 showing a lift arm linkage assembly 3146 in greater detail. FIG. 18 is an exploded perspective view of the lift arm linkage assembly 3146. The lift arm linkage assembly 3146 includes an H-shaped linkage 3148, a connecting rod 3150, a resting insert 3152, and a biasing means, such as a pair of springs 3154 (e.g., torsion springs).

The H-shaped linkage 3148 includes first and second arms 3156, 3158 and a cross-bar 3160 connecting the first and second arms 3156, 3158 at the centers thereof. Accordingly, each of the first and second arms 3156, 3158 has a first end 3156a, 3158a, and a second end 3156b, 3158b, respectively. Each of the first and second ends 3156a, 3158a, 3156b, 3158b has a hole 3162 extending therethrough. The holes 3162 are transverse to the length of each arm 3156, 3158, and parallel to the cross-bar 3160. The H-shaped linkage 3148 is connected with a mounting block 3164 extending from the bottom of the base 3046. The mounting block 3164 is sized to fit between the first and second arms 3156, 3158, and includes a hole 3166 (not shown) extending therethough. When the mounting block 3164 is positioned between the first and second arms 3156, 3158, the hole 3166 of the mounting block 3164 is aligned with the respective hole 3162 of each first end 3156a, 3158a of the first and second arms 3156, 3158. A first pin 3168 rotatably links the H-shaped linkage 3148 with the mounting block 3164, such that the first pin 3168 extends through one hole 3162 of the first arm 3156, the hole 3166 of the mounting block 3164, and one hole 3162 of the second arm 3158. The H-shaped linkage 3148 can rotate about the first pin 3168.

The connecting rod 3150 is a substantially linear component having two ends with a hole 3170 extending transversely through each end. The connecting rod 3150 is sized to fit between the first and second arms 3156, 3158. When the connecting rod 3150 is positioned between the first and second arms 3156, 3158, the hole 3170 of the connecting rod 3150 is aligned with the respective hole 3162 of each second end 3156b, 3158b of the first and second arms 3156, 3158. A second pin 3172 rotatably links the H-shaped linkage 3148 with the connecting rod 3150, such that the second pin 3172 extends through one hole 3162 of the first arm 3156, the hole 3170 of the connecting rod 3150, and one hole 3162 of the second arm 3158. The H-shaped linkage 3148 and the connecting rod 3150 can rotate about the second pin 3172. The second pin 3172 includes an extended portion 3174 that has a rotatable roller 3176 (see FIG. 17) secured thereto. The rotatable roller 3176 is configured to engage an ejection cam track of a folding machine, and is discussed in greater detail below in connection with FIG. 19.

The resting insert 3152 includes a body 3178, a front forked end 3180, and a rear split end 3182. The front forked end 3180 is configured to be positioned adjacent the connecting rod 3150 and includes first and second arms 3184a, 3184b extending from the body 3178. The first and second arms 3184a, 3184b each have a hole 3186 that extends transversely therethrough. The first and second arms 3184a, 3184b are spaced apart such that the connecting rod 3150 can be positioned between the first and second arms 3184a, 3184b. When the connecting rod 3150 is positioned between the first and second arms 3184a, 3184b, the hole 3170 of the connecting rod 3150 is aligned with the holes 3186 of the first and second arms 3184a, 3184b. A third pin 3188 rotatably links the connecting rod 3150 with the resting insert 3152, such that the third pin 3188 extends through one hole 3186 of the first arm 3184a, the hole 3170 of the connecting rod 3150, and one hole 3186 of the second arm 3184b. The connecting rod 3150 and the resting insert 3152 can rotate about the third pin 3188. The rear split end 3182 includes a first leg 3190a and a second leg 3190b connected with the body 3178 and spaced apart forming a notch 3192. The notch 3192 is sized such that the springs 3154 can fit therein, e.g., the springs 3154 can be positioned between the first and second legs 3190a, 3190b. The first and second legs 3190a, 3190b each have a hole 3193 that extends transversely therethrough. The resting insert 3152 is rotatably connected with the base 3046 and the lift arm 3086, which is discussed in greater detail below.

Referencing FIGS. 16 and 17, the lift arm 3086 includes a substantially planar body 3194, a back plate 3196 that extends from and is substantially coplanar with the body 3194, first and second fork prongs 3198a, 3198b extend from and are substantially coplanar with the body 3194 (except for the depressed regions 3200a, 3200b, discussed in greater detail below), and first and second brackets 3202a, 3202b extending transversely from lateral sides of the lift arm 3086. The first and second brackets 3202a, 3202b each include a hole 3204 that extends transversely therethrough. The depressed regions 3200a, 3200b extend from an end of the first and second fork prongs 3198a, 3198b and are configured to fit within, and have a substantially similar profile to, the depression 3072 of the base 3046. The lift arm 3086 is configured to be rotatably connected with the base 3046 and the resting plate 3152.

The base 3046 includes a first linear edge 3048; however, the base 3046 does not include the distal edge 84 as illustrated in FIGS. 1 and 2, but, instead, includes a distal gap 3206 that is opposite the first linear edge 3048. The distal gap 3206 provides a space for components of the lift arm linkage assembly 3146, e.g., the resting insert 3152, and the back plate 3196 of the lift arm 3086, to extend into during operation. For example, when the lift arm 3086 is lifted, the back plate 3196 will rotate into the distal gap 3206. The distal gap 3206 extends toward the center of the base 3046 to accommodate the connecting rod 3150 and the resting plate 3152. The base 3046 includes first and second mounting tabs 3208a, 3208b positioned on lateral sides of the distal gap 3206 and extending transversely from the base 3046. The first and second mounting tabs 3208a, 3208b are parallel to one another and each include a hole 3210 extending therethrough.

Figure 20:
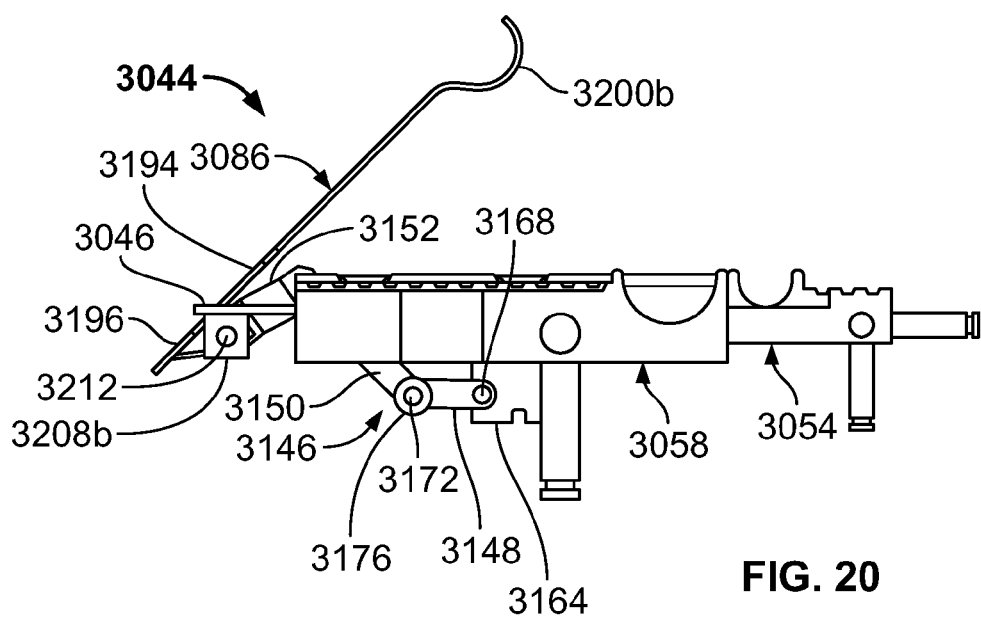
FIG. 20 is a side elevational view of the folding platform of FIG. 16 with the lift arm in a partially extended position.
Figure 21:
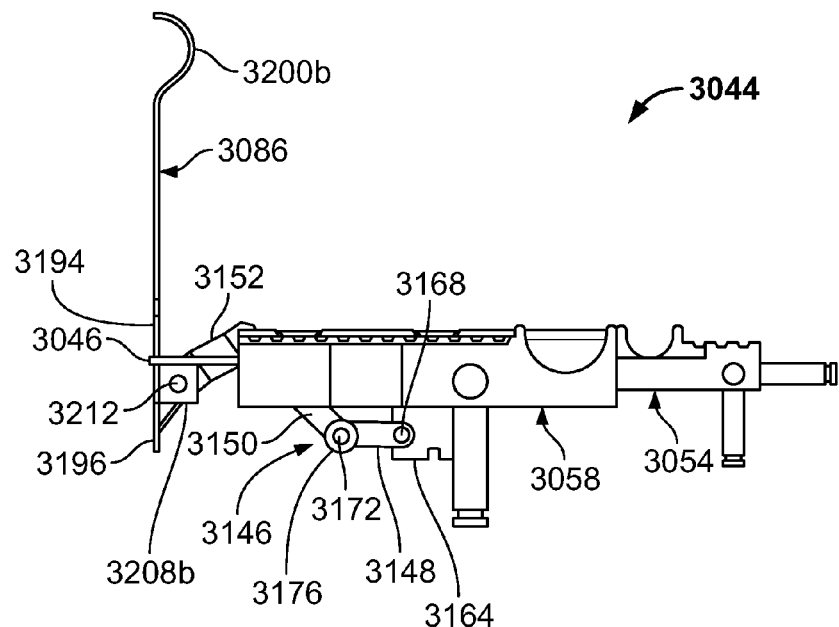
FIG. 21 is a side elevational view of the folding platform of FIG. 16 with the lift arm in a second partially extended position.
Figure 22:
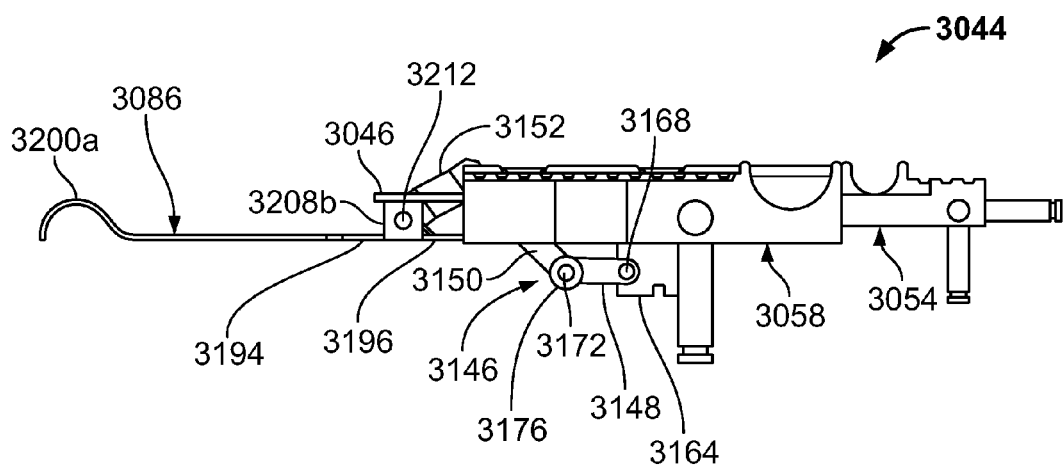
FIG. 22 is a side elevational view of the folding platform of FIG. 16 with the lift arm in a fully extended position.

The width of the distal gap 3206, e.g., the space between the first and second mounting tabs 3208a, 3208b, is sized to be slightly larger than a distance extending from the outside of the first bracket 3202a to the outside of the second bracket 3202b of the lift arm 3086. Accordingly, the first and second brackets 3202a, 3202b can be positioned between the first and second mounting tabs 3208a, 3208b. Similarly, the width of the resting plate 3152 is such that the resting plate 3152 can be positioned between the first and second brackets 3202a, 3202b of the lift arm 3086. When the resting plate 3152 is positioned between the first and second brackets 3202a, 3202b, and the first and second brackets 3202a, 3202b are positioned between the first and second mounting tabs 3208a, 3208b, the holes 3186, 3204, 3210 of each, respectively, are aligned. The springs 3154 can be positioned within the notch 3192 of the resting plate 3152, and the springs 3154, resting plate 3152, lift arm 3086, and base 3046 rotationally engaged with a fourth pin 3212. More specifically, the fourth pin 3212 extends across the first mounting tab 3208a, the first bracket 3202a, the first leg 3190a, the springs 3154, the second leg 3190b, the second bracket 3202b, and the second mounting tab 3208b. This engagement completes the lift arm linkage assembly 3146, and links the mounting block 3164, the H-shaped linkage 3148, the connecting rod 3150, the resting plate 3152, the springs 3154, the lift arm 3086, and the base 3046. When the lift arm linkage 3146 is assembled, the springs 3154 are positioned within the notch 3192 such that first arms 3214 of the spring 3154 engage an engagement face 3216 of the resting plate 3152, and second arms 3218 of the springs 3154 engage the back plate 3196 of the lift arm 3086. In a "resting" position, the springs 3154 bias the lift arm 3086 to a position abuttingly adjacent against the base 3046. Accordingly, rotation of the lift arm 3086 away from a position adjacent to the base 3046 will compress the springs 3154. As illustrated in FIGS. 20-22, this functionality allows for the lift arm 3086 to "break-away" from the base 3046 when a force is exerted against the lift arm 3086 and rotate a substantial amount, e.g., 180 degrees or more (See, e.g., FIG. 22), with respect to the base 3046. Once the force being exerted against the lift arm 3086 is removed, the springs 3154 force the lift arm 3086 back to a resting position.

FIG. 19 is a perspective view of the folding platform 3044 of FIG. 16 on a folding machine 3220 showing the clearances between the folding platform lift arm 3086 and a removal assembly 3222. The removal assembly 3222 includes first and second tracks 3224a, 3224b and a central arm 3226 that includes a roller 3228. In some constructions, the central arm 3226 can be an additional track. When the lift arm 3086 of the folding platform 3044 is lifted for removal of the food item, the first fork prong 3198a is positioned between the first track 3224a and the central arm 3226, and the second fork prong 3198b is positioned between the central arm 3226 and the second track 3224b. As can be seen in FIG. 22, the clearance between the first and second fork prongs 3198a, 3198b, and the first track 3224a, the second track 3224b, and the central arm 3226 is minimal. Accordingly, a slightest misalignment of the lift arm 3086, the first track 3224a, the second track 3224b, or the central arm 3226 might result in the lift arm 3086 contacting any one of the components of the removal assembly 3222. Alternatively, there may be a backup of food products on the removal assembly 3222.

Referring to U.S. Pat. Nos. 5,912,035 and 7,487,718 and the devices shown in FIGS. 1-13, the lift arm 86 (e.g., FIGS. 1-13 of the present disclosure) may become obstructed, such that it is unable to properly lower, which could cause it to snap off. However, in embodiments of the present invention, the lift arm 3086 and the lift arm linkage 3146 of the present disclosure (e.g., FIGS. 14-22) allows the lift arm 3086 to bend backwards when in contact with such obstructions and continue along the folding machine 3220 until it disengages the obstruction.

FIGS. 20-22 illustrate the lift arm 3086 of the folding platform 3044 being lifted and extended beyond a normal operating rotation. In operation, the folding platform 3044 is connected with a conveyor of the folding machine 3220 (see FIG. 19) that operates to fold a food product on the folding platform 3044, e.g., a burrito, eggroll, grape leaf, etc. Reference can be made to U.S. Pat. No. 5,912,035 with respect to the conveyor. Once the food product is folded to a certain point, it is transferred from the conveyor, e.g., the folding platform 3044 is directed to an ejection area. For example, the folding platform 3044 can be a three-flap folding platform as illustrated, or can be a single-flap folding platform, such as that illustrated in FIGS. 23-27. A food product produced by a three-flap folding platform could be ejected to undergo further folding, while a food product produced by a single-flap folding platform may be ejected without further folding. The lift arm 3086 and lift arm linkage assembly 3146 are not limited in applicability to a three-flap folding platform, but are equally applicable to a single-flap folding platform. The ejection area includes an ejection cam track that is positioned below the folding platform 3044 and configured to engage the rotatable roller 3176 of the second pin 3172. When the rotatable roller 3176 contacts the ejection cam track, the second pin 3172 is forced toward the base 3046, causing the components of the lift arm linkage assembly 3146 to mechanically engage and lift the lift arm 3086 away from the base 3046 and thus lift the food product located in the depressed regions 3200*a*, 3200*b* of the lift arm 3086. This occurs through rotation of the lift arm 3086 a first rotational distance. FIG. 20 is a side view of the folding platform 3044 not connected with a folding machine, but with the lift arm 3086 rotated the first rotational distance. Accordingly, the height that the lift arm 3086 is lifted from the base 3046 is generally determined by the ejection cam track. As the lift arm 3086 is lifted, the folding platform 3044 continues along the conveyor where it then transfers the food product to the removal assembly 3222. When the lift arm 3086 of the folding platform 3044 is lifted for removal of the food item, the first fork prong 3198*a* is positioned between the first track 3224*a* and the central arm 3226, and the second fork prong 3198*b* is positioned between the central arm 3226 and the second track 3224*b*. While the central arm 3226 is between the first and second fork prongs 3198*a*, 3198*b*, the folding platform 3046 is lowered through alterations in the conveyor of the folding machine 3220 and the lift arm 3086 is kept in the lifted position. As the folding platform 3046 lowers, the food product is placed on the removal assembly 3222. The ejection cam track is sized to end once the food product is placed on the removal assembly 3222. Accordingly, once the food product is placed on the removal assembly 3222, the roller 3176 disengages the ejection cam track and the lift arm 3086 returns to its position abuttingly adjacent the base 3046. In normal operation, the lift arm 3086 does not contact any component of the removal assembly 3222. However, during the course of operation, the first track 3224*a*, the second track 3224*b*, or the central arm 3226 may become misaligned or there may be a backup of food products on the removal assembly 3222. In both instances, the lift arm 3086 may become obstructed during lowering, e.g., through contact with the components of the removal assembly 3222 or a backup of food products, and forced away from the base 3046. When this occurs, the lift arm 3086 is forced to rotate a second rotational distance that is greater than the first rotational distance. FIG. 21 is a side view of the folding platform 3044 not connected with a folding machine, but with the lift arm 3086 rotated the second rotational distance. FIG. 22 is a side view of the folding platform 3044 not connected with a folding machine, but with the lift arm 3086 rotated an even greater second rotational distance. During this occurrence, the springs 3154 are compressed between the engagement face 3216 of the resting plate 3152 and the back plate 3196 of the lift arm 3086, and the lift arm 3086 is permitted to rotate for as long as it is in contact with the obstruction. Once the obstruction is cleared the energy stored in the springs 3154 is released and the lift arm 3086 snaps back into position adjacent to the base 3046. Accordingly, the mechanical relationship between the lift arm 3086, the springs 3154, and the remainder of the lift arm linkage assembly 3146 permits the lift arm 3086 to contact an obstruction and rotate with respect to the components of the lift arm linkage assembly 3146 without bending or otherwise breaking portions of the lift arm 3086 itself.

One of ordinary skill in the art would understand that the springs 3154 can be torsion springs, coil springs, leaf springs, or any other spring that would effect the result described above. Further, the springs 3154 can be a single spring in place of two springs, or alternatively can be more than two springs. Any suitable biasing means could be provided.

FIGS. 23-33 illustrate a fifth embodiment of the present disclosure. Elements illustrated in FIGS. 23-33 which correspond substantially to the elements described above with reference to FIGS. 9-13 have been designated with corresponding reference numerals increased by an increment of three thousand. The embodiment of the present disclosure shown in FIGS. 23-33 operates and is constructed consistent with the foregoing description of the folding platform 1044, unless it is stated otherwise.

Figure 23:
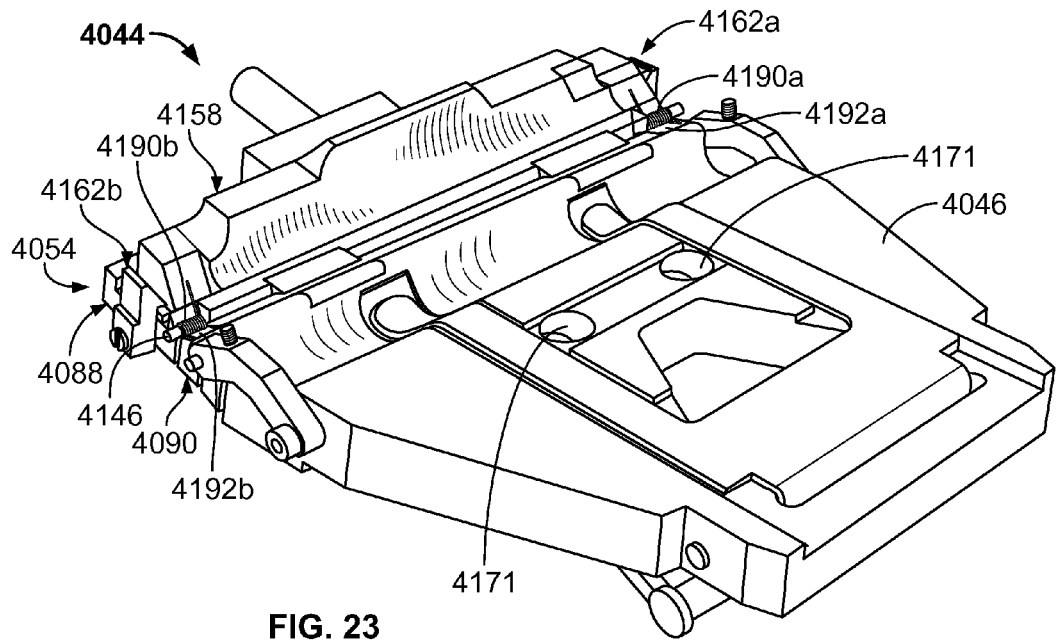
FIG. 23 is a top perspective view of a folding platform including a removable ridge insert for filled taquito shells constructed in accordance with a fifth embodiment.

Referring to FIGS. 23-27, a folding platform 4044 is illustrated with a removable ridge insert 4158. The removable ridge insert 4158 is utilized to create a fold in a food product shell that is draped over the folding platform 4044. The folding platform 4044 has a substantially planar base 4046 and a first flap 4054 which is articulated. The first flap 4054 includes an upper and lower flap members 4088, 4090 rotatably connected by a pintle 4146. However, since this embodiment is more ideal for small, open-ended folded food products, such as taquitos and the like, which have less filling and require fewer folds than a burrito, the folding platform 4044 is not shown with second and third folding flaps. The first flap 4054 differs from the first flap 1054 of FIGS. 9-13, for example, in that the upper flap member 4088 includes a removable ridge insert 4158, as shown in FIG. 23, which is a perspective view of the folding platform 4044 with the removable ridge insert 4158.

Figure 24:
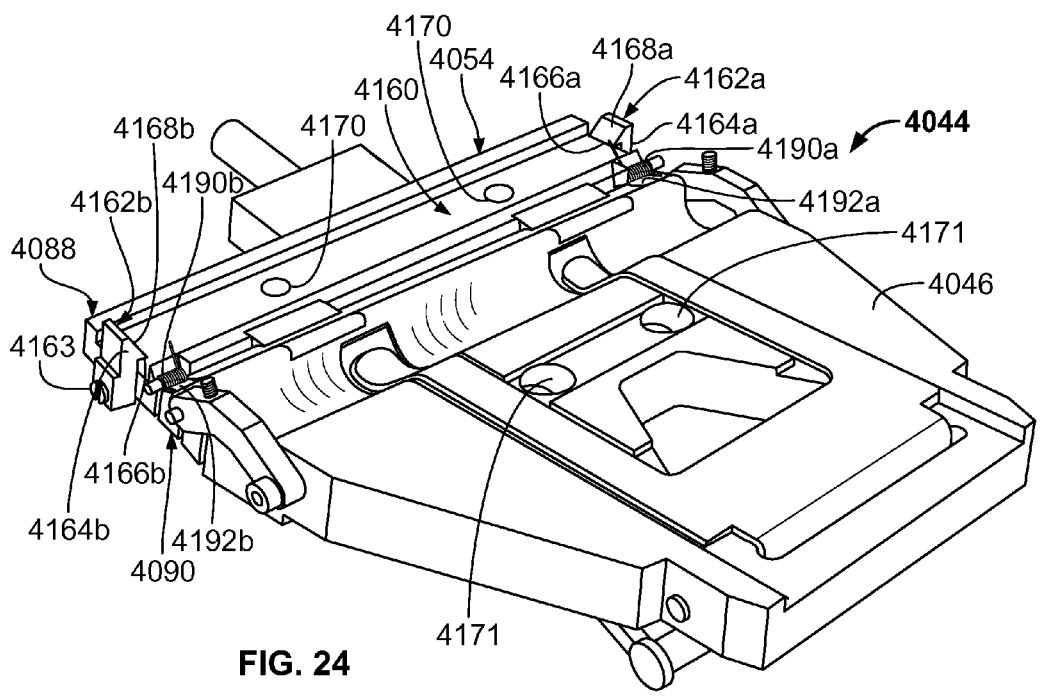
FIG. 24 is a top perspective view of the folding platform of FIG. 23 without the removable ridge insert.
Figure 25:
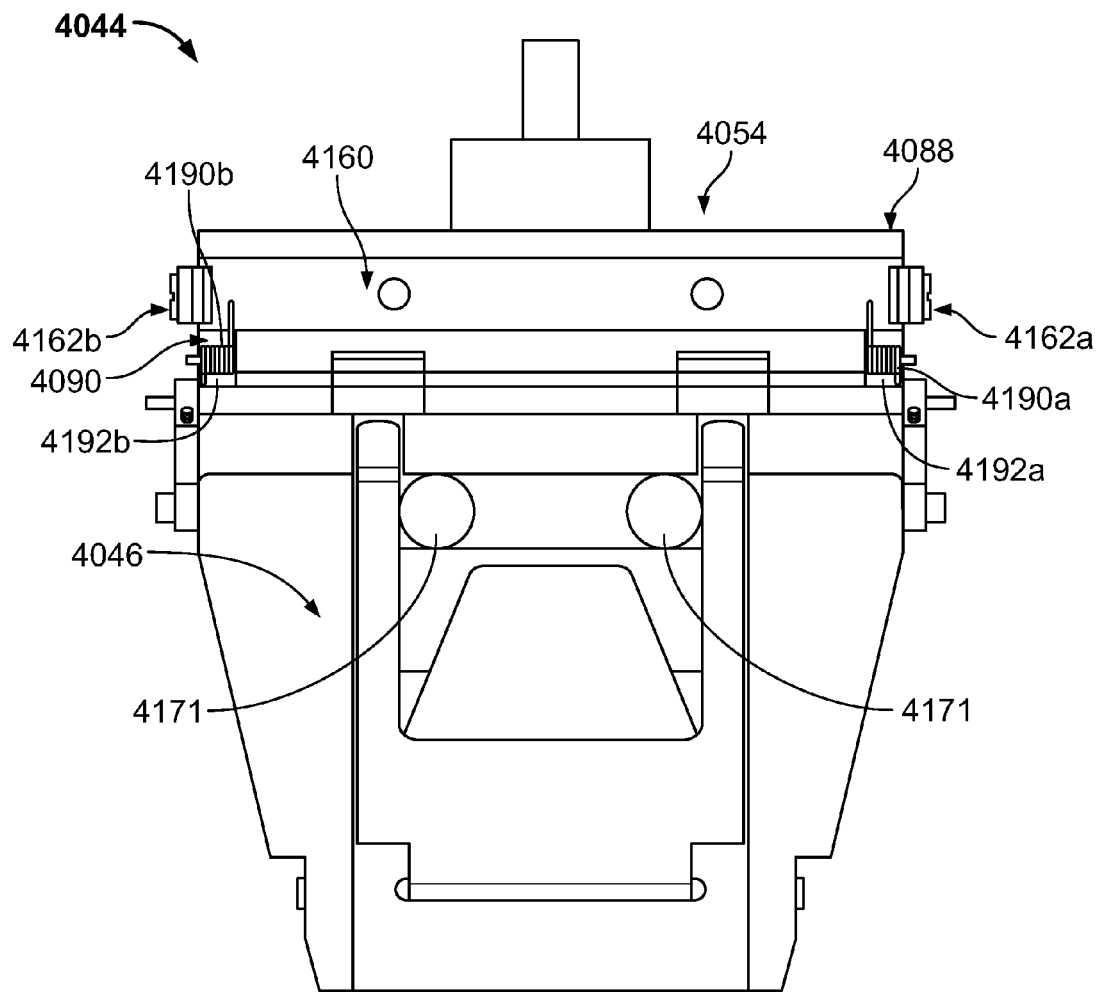
FIG. 25 is a top plan view of the folding platform of FIG. 24.
Figure 26:
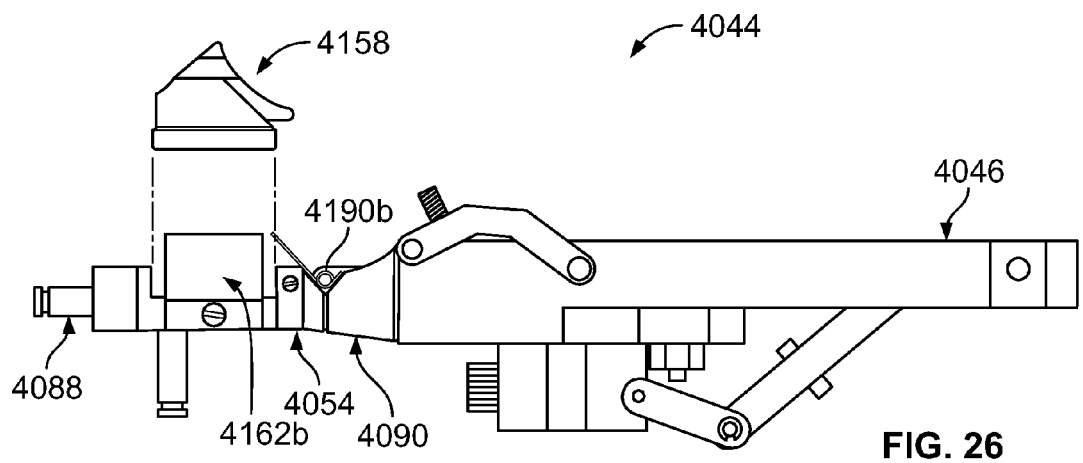
FIG. 26 is a side elevational view of the folding platform of FIG. 24.
Figure 27:
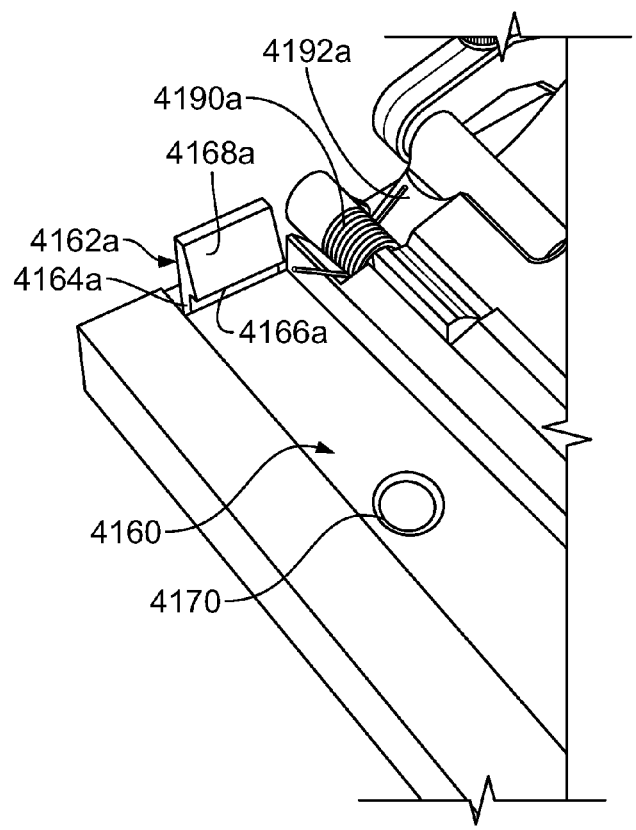
FIG. 27 is a partial top perspective view of the locking tab of the folding platform of FIG. 24.
Figure 28:
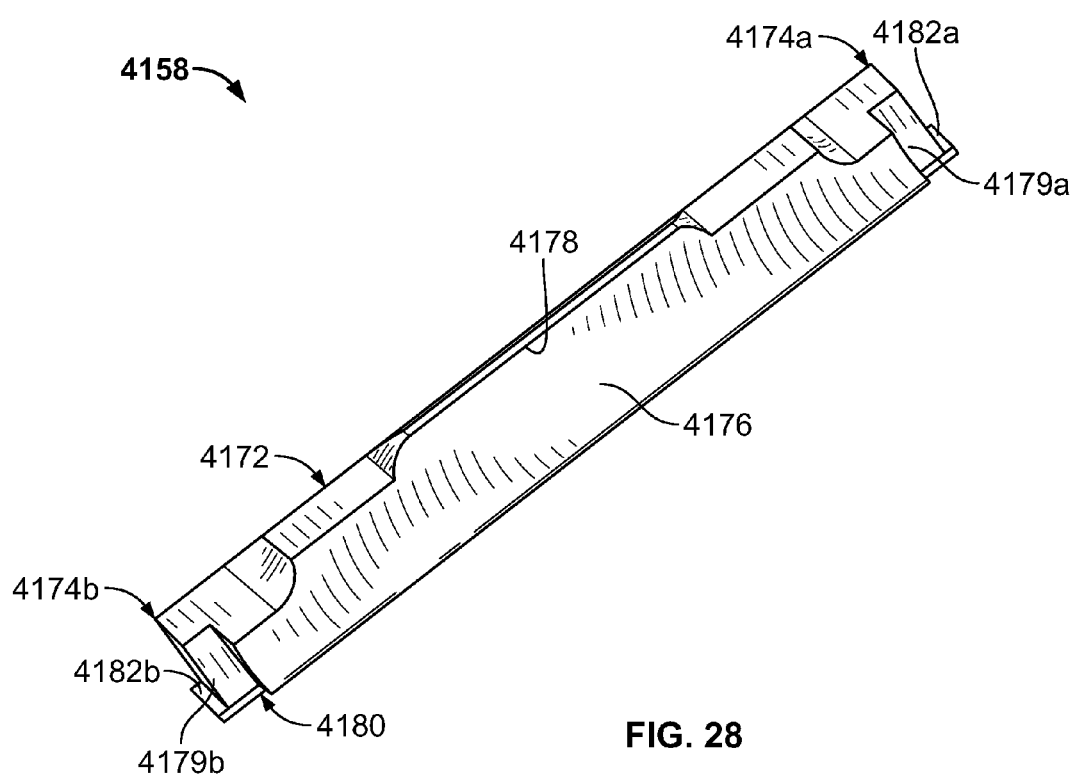
FIG. 28 is a top perspective view of the removable ridge insert of FIG. 23.
Figure 29:
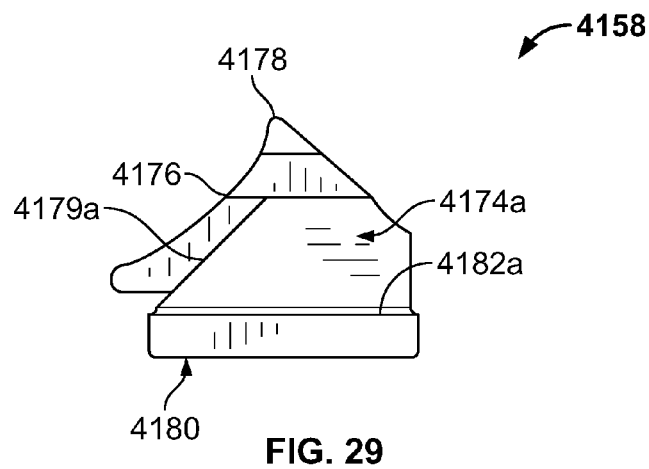
FIG. 29 is a side elevational view of the removable ridge insert of FIG. 28.
Figure 30:
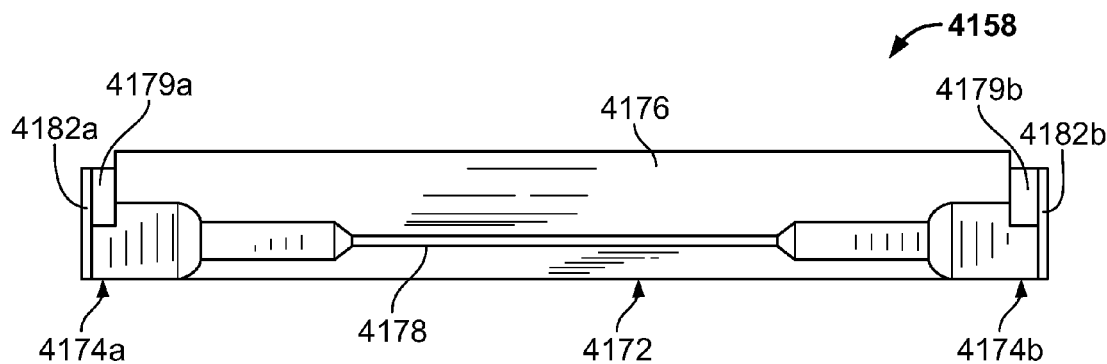
FIG. 30 is a top plan view of the removable ridge insert of FIG. 28.

FIG. 24 is a perspective view of the folding platform 4044 without the removable ridge insert 4146. The first flap 4054 includes a channel 4160 disposed therein and extending across the length thereof. The channel 4160 includes securing means 4162*a*, 4162*b* for securing the removable ridge insert 4158 to the first flap 4054. The securing means can be positioned on opposite sides of, and adjacent to, the channel 4160. An example of the securing means 4162*a*, 4162*b* includes first and second locking tabs. FIG. 27 is a partial perspective view of the first locking tab 4162*a*. The first and second locking tabs 4162*a*, 4162*b* can be attached to the first flap 4054 by a screw 4163, or, alternatively, they can be integral with the first flap 4054. The first and second locking tabs 4162*a*, 4162*b* are generally flag-shaped resiliently flexible members. Specifically, the first and second locking tabs 4162*a*, 4162*b* each include a body 4164*a*, 4164*b* that is connected with the first flap 4054, a locking shoulder 4166*a*, 4166*b*, and a slanted head 4168*a*, 4168*b*. The first and second locking tabs 4162*a*, 4162*b* are positioned on the first flap 4054 such that the locking shoulders 4166*a*, 4166*b* are positioned to be adjacent the channel 4160 and with a gap between the locking shoulders 4166*a*, 4166*b* and a bottom of the channel 4160. The first and second locking tabs 4162*a*, 4162*b* are configured to removably secure or lock the removable ridge insert 4158 in the channel 4160 and to the first flap 4054. The first flap 4054 can also include a plurality of optional guide holes 4170 extending through the channel 4160. The optional guide holes 4170 can accept a screw or threaded bolt (not shown) to removably secure the removable ridge insert 4158 in the channel 4160 and to the first flap 4054. The screw or threaded bolt is an example of another securing means that can be utilized. It should be understood that the optional guide holes 4170, and the screw or threaded bolt, are not necessary when the first and second locking tabs 4162*a*, 4162*b* are implemented. However, the optional guide holes 4170, and screw or threaded bolt, can be used in place of, or in addition to, the first and second locking tabs 4162a, 4162b.

The folding platform 4044 can include bolts 4171 extending through the base 4046. The bolts 4171 are for removably attaching the folding platform. In some embodiments, the folding platform 4044 can include a weld in place of the bolts 4171.

FIGS. 28-33 illustrate the removable ridge insert 4158 in greater detail. The ridge insert 4158 includes an elongated body 4172 having first and second sides 4174a, 4174b. The body 4172 defines an arched ridge 4176 that comes to an edge 4178, and first and second slanted walls 4179a, 4179b that are on opposite sides of the arched ridge 4176. The arched ridge 4176 of the removable ridge insert 4158 generally correlates to the desired size, e.g., diameter, of the folded food product. Accordingly, a first removable ridge insert can be provided with a first arched ridge having a first diameter (e.g., thirty millimeters) corresponding with a first diameter of a first food product, and a second removable ridge insert (e.g., thirty-five millimeters) can be provided with a second arched ridge having a second diameter corresponding with a second diameter of a second food product, where the first diameter is different than the second diameter, for example. The first and second removable ridge inserts can be interchangeable depending on desired folded food product diameter. The edge 4178 can be stepped such that it has different heights along the length thereof. In accordance therewith, the top of the elongated body 4172 can be stepped such that the edge 4178 is also stepped. In other embodiments, the edge 4178 can have a uniform height. The elongated body 4172 includes a base 4180 that defines a retention means 4182a, 4182b for engaging the securing means and removably connecting the removable ridge insert 4158 with the first flap 4054. The retention means 4182a, 4182b can be first and second ridges 4182a, 4182b positioned at the first and second sides 4174a, 4174b of the elongated body 4172. The first and second ridges 4182a, 4182b have a thickness such that each fits between the first and second shoulders 4166a, 4166b of the locking tabs 4162a, 4162b and the bottom of the channel 4160. Additionally, the base 4180 of the ridge insert 4158 is dimensioned to fit within the channel 4160 of the first flap 4054. More specifically, the base 4180 has a length that is substantially equal to the length of the channel 4160 that extends between the locking tabs 4162a, 4162b, and a width that is substantially equal to the width of the channel 4160.

Figure 31:
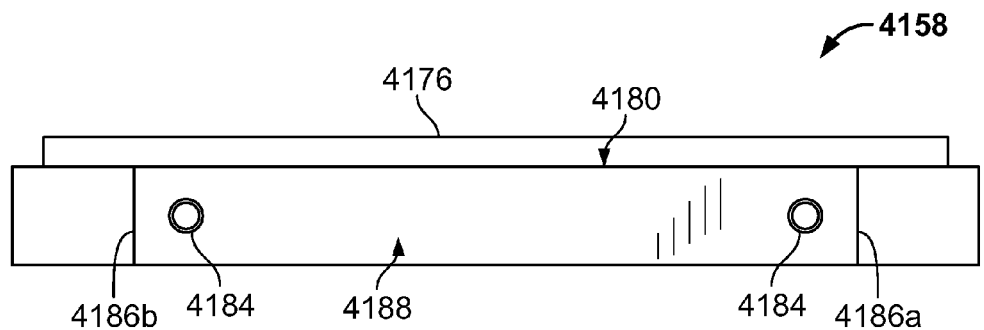
FIG. 31 is a bottom plan view of the removable ridge insert of FIG. 28.
Figure 32:
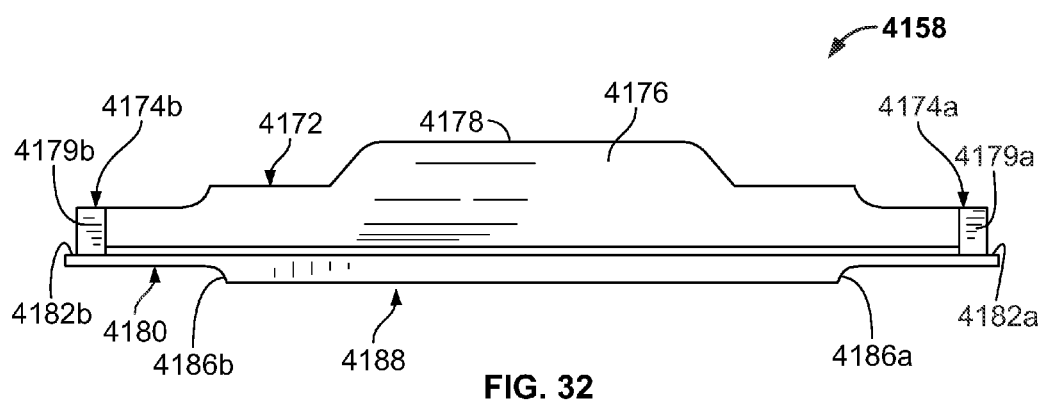
FIG. 32 is a front elevational view of the removable ridge insert of FIG. 28.
Figure 33:
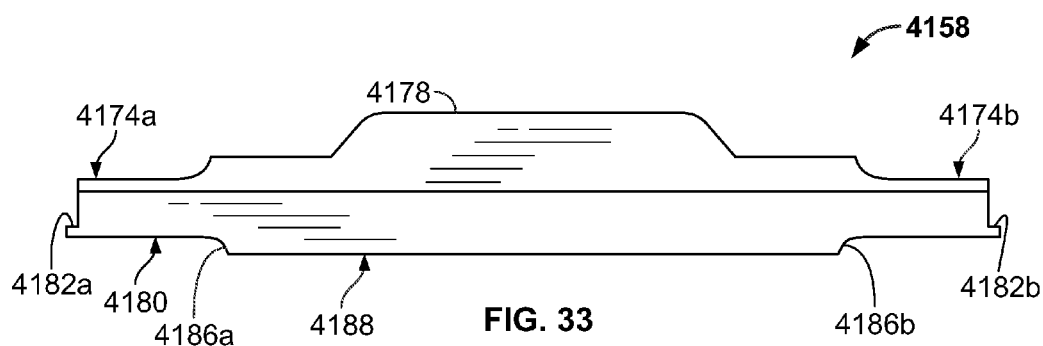
FIG. 33 is a rear elevational view of the removable ridge insert of FIG. 28.

FIG. 31 is a bottom view of the removable ridge insert 4158. The ridge insert 4158 can have one or more optional threaded holes 4184 extending through the bottom of the base 4180. The optional threaded holes 4184 are spaced to match the optional guide holes 4170 that extend through the channel 4160. Accordingly, a screw or threaded bolt (not shown) can extend through the optional guide holes 4170 and be threadedly engaged with the optional threaded holes 4184 to removably secure the removable ridge insert 4158 in the channel 4160 and to the first flap 4054. It should be understood that the optional threaded holes 4184, and the screw or threaded bolt, are not necessary when the first and second locking tabs 4162a, 4162b are implemented. However, the optional threaded holes 4184, and screw or threaded bolt, can be used in place of, or in addition to, the first and second locking tabs 4162a, 4162b. Additionally, the bottom of the ridge insert 4158 can include first and second notches 4186a, 4186b that form a projected region 4188. The first and second notches 4186a, 4186b, and the projected region 4188, can provide a second-level of securing the ridge insert 4158 to the first flap 4066 where the channel 4160 includes a matching indentation (not shown) that receives the projected region 4188. In such an embodiment, the ridge insert 4158 would be prevented from linear movement through the mating of the projected region 4188 with the matching indentation.

It should be understood by one of ordinary skill in the art that the optional guide holes 4170 and the optional threaded holes 4184 are not necessary components, but instead are optional and can be omitted.

Furthermore, the folding platform 4044 includes a biasing mechanism for causing the upper flap member 4088 to retract after creating a second fold in a taquito shell. The folding platform 4044 includes first and second torsion springs 4190a, 4190b that are positioned over the ends of the pintle 4146 that rotatably connects, and functions as a hinge between, the upper and lower flap members 4088, 4090. The lower flap member 4090 includes first and second slanted walls 4192a, 4192b on opposite sides of the lower flap member 4090. The first torsion spring 4190a engages the first slanted wall 4192a of the lower flap member 4090 and the first slanted wall 4179a of the ridge insert 4158. The second torsion spring 4190b engages the second slanted wall 4192b of the lower flap member 4090 and the second slanted wall 4179b of the ridge insert 4158. To the extent that the upper flap member 4090 rotates downward toward the depression 4072 after the lower flap member 4088 has reached the limit of its rotation, the torsion springs 4190a, 4190b compress, storing energy for retracting the upper flap member 4088 back into planar alignment with the lower flap member 4090, such deflection being accomplished upon the release of the upper flap member 4088 from the downward urging force.

To attach the removable ridge insert 4188 to the first flap 4054, a user first aligns the ridge insert 4188 with the arched ridge 4176 facing the planar base 4046, the first ridge 4182a aligned with the first locking tab 4162a, and the second ridge 4182b aligned with the second locking tab 4162b. The user then forces the ridge insert 4188 downward with the bottom of the first ridge 4182a contacting the first slanted head 4168a and the second ridge 4182b contacting the second slanted head 4168b. A continued downward force along with the engagement of the first ridge 4182a with the first slanted head 4168a and the second ridge 4182b with the second slanted head 4168b forces the locking tabs 4162a, 4162b outward such that they bend at the respective body 4164a, 4164b. The ridge insert 4188 is continued to be forced downward until the first and second ridges 4182a, 4182b pass the first and second slanted heads 4168a, 4168b, at which point the first and second locking tabs 4162a, 4162b snap back to their original up-right position and the ridge insert 4188 is in a "locked" position. In the "locked" position, the base 4046 of the ridge insert 4188 is secured in the channel 4160, and the first and second shoulders 4166a, 4166b of the locking tabs 4162a, 4162b are adjacent and overlapping the first and second ridges 4182a, 4182b of the ridge insert 4188. Accordingly, in the "locked" position, the ridge insert 4188 can not be removed from the channel 4160 without first disengaging the locking tabs 4162a, 4162b. FIG. 23 is a perspective view of the folding platform 4044 with the removable ridge insert 4188 secured in the channel 4160.

To disengage the locking tabs 4162a, 4162b and remove the ridge insert 4188, a user first pulls back one of the locking tabs 4162a, 4162b. This can be achieved by using a prying tool, e.g., a screw driver, and inserting it between one of the shoulders 4166a, 4166b and the respective ridge

4182a, 4182b. Once one of the locking tabs 4162a, 4162b is disengaged the user can pull the ridge insert 4188 out of the channel 4160.

The removable ridge insert 4188 can be of different shapes and sizes so long as the base 4058 is uniform so that it can be positioned in the channel 4160 with the locking tabs 4162a, 4162b engaging the respective ridge 4182a, 4182b. Accordingly, a user can have multiple removable ridge inserts 4188 that have different characteristics, but with the same sized base 4046. For example, different ridge inserts can have different diameter or shaped arched ridges 4176, each of which can be used for a different purpose. For example, a larger diameter arched ridge can be used to create larger diameter food products, e.g., burritos, while smaller diameter arched ridges can be used to create smaller diameter food products, e.g., taquitos. The present disclosure allows a user to quickly switch different removable ridge inserts based on the desired food product.

As discussed above, multiple removable ridge inserts 4188 can be provided, each one having an arched ridge 4176 with diameter different than the other one. For example, a first removable ridge insert can be provided with an arched ridge having a first diameter, e.g., a thirty millimeter diameter, while a second removable ridge insert can be provided with an arched ridge having a second diameter, e.g., a thirty-five millimeter diameter. The first and second removable ridge inserts can be interchangeable with a single folding platform. Accordingly, a user can engage the first removable ridge insert with a folding platform to manufacture a first food product, and then remove the first removable ridge insert, and "swap" the second removable ridge insert into the same folding platform to create a food product having a larger diameter. Accordingly, different removable ridge inserts having different diameter arched ridges can be "swapped" in and out of the same folding platform depending on a desired folded food product diameter.

One of ordinary skill in the art would understand that the channel and removable ridge insert could be incorporated into a folding platform having any suitable number of folding flaps. For example, the three-flap folding platform shown in the embodiment of FIGS. 1-8 could be adapted to receive the removable ridge insert in accordance with the teachings of the present invention.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A folding platform for forming a folded food product made from a flexible shell, said platform comprising:
   a folding flap pivotally connected to a base, the base having an upper surface, a gap formed along a side of the upper surface of the base that is distal from said folding flap, a mounting block, and at least one mounting tab extending from the base;
   a lift arm having a body, a back plate extending from the body, and at least one mounting bracket extending from the body, the lift arm being pivotally connected to the base;
   a lift arm linkage assembly including an engagement wall and a spring engaging the engagement wall and the lift arm back plate, the lift arm linkage assembly being pivotally connected to the mounting block, and to the lift arm; and
   a pin extending through the at least one mounting tab, the at least one mounting bracket, the lift arm linkage assembly, and the spring, the pin rotatably connecting the base, the lift arm, and the lift arm linkage assembly,
   wherein said folding platform is adapted to assume a substantially open configuration so as to permit (i) a flexible food product shell to be draped across the folding flap, the lift arm, and the upper surface of said base, and (ii) a food filling portion to be deposited on the shell above the base;
   wherein the folding flap is adapted to rotate relative to the base so as to cause a side portion of the shell, initially draped across the first flap, to overlay the food filling portion deposited on the base;
   wherein the lift arm is adapted to rotate about the pin a first rotational distance in a first rotational direction so as to lift the shell from the base for deposit on an ejection track; and
   wherein the spring is configured to permit the lift arm to rotate about the pin a second rotational distance along the first rotational distance direction that is greater than the first rotational distance when a force is imparted on the lift arm in the first rotational direction, the spring biasing the lift arm to move in a second rotational direction that is opposite the first rotational direction when the force is removed from the lift arm.

2. The folding platform of claim 1, further comprising:
   a second folding flap pivotally connected to the base; and
   a third folding flap pivotally connected to the base,
   wherein the second folding flap is adapted to rotate in a third rotational direction relative to the base so as to cause a side portion of the shell, initially draped across the second folding flap, to overlay the food filling portion deposited on the base, and
   wherein the third folding flap is adapted to rotate in a fourth rotational direction relative to the base so as to cause a side portion of the shell, initially draped across the third folding flap, to overlay the food filling portion deposited on the base.

3. The folding platform of claim 1, wherein the lift arm linkage assembly further comprises a roller adapted to engage the ejection track.

4. The folding platform of claim 3, wherein when the roller engages the ejection track the lift arm linkage rotates the lift arm about the pin the first rotational distance in the first rotational direction.

5. The folding platform of claim 1, wherein the folding flap further comprises a first elongate edge, a channel, and a means for securing that engages a first removable ridge insert and secures the first removable ridge insert to the folding flap, the first removable ridge insert having an arched ridge formed along an edge thereof and a means for retention that engages the means for securing to secure the first removable ridge insert with the folding flap,
   wherein said folding flap is pivotally attached to said base along said elongate edge of said base and said first elongate edge of said folding flap so as to permit said folding flap to rotate in a first rotational direction relative to said base and thereby cause the side portion of the flexible shell, initially draped across said folding flap, to overlay a food filling portion deposited on the flexible shell above said base,
   wherein said first removable ridge insert is adapted to form an elongate fold in the overlaying side portion of the flexible shell, and to tuck the elongate fold underneath the food filling portion opposite said first elongate edge of said folding flap to form a first folded food product having a first diameter, wherein the removable ridge insert is configured to be inserted into the channel and removably retained in the channel through an engagement of the means for securing with the means for retention, and wherein the first arched ridge has a second diameter that correlates to the first diameter of the first folded food product.

6. The folding platform of claim 5, wherein the means for retention is a ridge and the means for securing is a resiliently flexible tab having a shoulder for engaging the ridge.

7. The folding platform of claim 5, further comprising a threaded bolt configured to engage the means for retention and the means for securing, wherein the means for retention is a threaded hole configured to receive the threaded bolt and the means for securing is a hole configured to receive the threaded bolt.

8. The folding platform of claim 5, further comprising a second removable ridge insert having an arched ridge formed along an edge thereof and a means for retention that engages the means for securing to secure the second removable ridge insert with the folding flap, wherein said second removable ridge insert is adapted to form an elongate fold in the overlaying side portion of the flexible shell, and to tuck the elongate fold underneath the food filling portion opposite said first elongate edge of said folding flap to form a second folded food product having a third diameter, and wherein the second arched ridge has a fourth diameter that correlates to the third diameter of the second folded food product.

9. The folding platform of claim 8, wherein the fourth diameter is different than the second diameter, and the third diameter is different than the first diameter.

10. A folding platform for forming a folded food product made from a flexible shell, said platform comprising:

a folding flap pivotally connected to a base having an upper surface;

a lift arm having a body and a back plate extending from the body, the lift arm being pivotally connected to the base; and a lift arm linkage assembly including an engagement wall and a spring, the lift arm linkage assembly being pivotally connected to the base and to the lift arm, and the spring engaging the engagement wall and the back plate, wherein said folding platform is adapted to assume a substantially open configuration so as to permit (i) a flexible food product shell to be draped across the folding flap, the lift arm, and the upper surface of said base, and (ii) a food filling portion to be deposited on the shell above the base, wherein the folding flap is adapted to rotate relative to the base, wherein the lift arm is adapted to rotate relative to the base a first rotational distance in a first rotation direction so as to lift the shell from the base for deposit on an ejection track, and wherein the spring is configured to permit the lift arm to rotate relative to the base a second rotational distance that is greater than the first rotational distance when a force is imparted on the lift arm in the first rotational direction, the spring biasing the lift arm to move in a second rotational direction that is opposite the first rotational direction when the force is removed from the lift arm.

11. The folding platform of claim 10, further comprising:
a second folding flap pivotally connected to the base; and
a third folding flap pivotally connected to the base, wherein the second folding flap is adapted to rotate in a third rotational direction relative to the base so as to cause a side portion of the shell, initially draped across the second folding flap, to overlay the food filling portion deposited on the base, and wherein the third folding flap is adapted to rotate in a fourth rotational direction relative to the base so as to cause a side portion of the shell, initially draped across the third folding flap, to overlay the food filling portion deposited on the base.

12. The folding platform of claim 10, wherein the lift arm linkage assembly further comprises a roller adapted to engage the ejection track.

13. The folding platform of claim 12, wherein when the roller engages the ejection track the lift arm linkage rotates the lift arm the first rotational distance in the first rotational direction.

14. The folding platform of claim 10, wherein the folding flap further comprises a first elongate edge, a channel, and a means for securing that engages a first removable ridge insert and secures the first removable ridge insert to the folding flap, the first removable ridge insert having an arched ridge formed along an edge thereof and a means for retention that engages the means for securing to secure the first removable ridge insert with the folding flap, wherein said folding flap is pivotally attached to said base along said elongate edge of said base and said first elongate edge of said folding flap so as to permit said folding flap to rotate in a first rotational direction relative to said base and thereby cause the side portion of the flexible shell, initially draped across said folding flap, to overlay a food filling portion deposited on the flexible shell above said base, wherein said first removable ridge insert is adapted to form an elongate fold in the overlaying side portion of the flexible shell, and to tuck the elongate fold underneath the food filling portion opposite said first elongate edge of said folding flap to form a first folded food product having a first diameter, wherein the removable ridge insert is configured to be inserted into the channel and removably retained in the channel through an engagement of the means for securing with the means for retention, and wherein the first arched ridge has a second diameter that correlates to the first diameter of the first folded food product.

15. The folding platform of claim 14, wherein the means for retention is a ridge and the means for securing is a resiliently flexible tab having a shoulder for engaging the ridge.

16. The folding platform of claim 14, further comprising a threaded bolt configured to engage the means for retention and the means for securing, wherein the means for retention is a threaded hole configured to receive the threaded bolt and the means for securing is a hole configured to receive the threaded bolt.

17. The folding platform of claim 14, further comprising a second removable ridge insert having an arched ridge formed along an edge thereof and a means for retention that engages the means for securing to secure the second removable ridge insert with the folding flap,
  wherein said second removable ridge insert is adapted to form an elongate fold in the overlaying side portion of the flexible shell, and to tuck the elongate fold underneath the food filling portion opposite said first elongate edge of said folding flap to form a second folded food product having a third diameter, and
  wherein the second arched ridge has a fourth diameter that correlates to the third diameter of the second folded food product.

18. The folding platform of claim 17, wherein the fourth diameter is different than the second diameter, and the third diameter is different than the first diameter.

* * * * *